(12) United States Patent
Huang et al.

(10) Patent No.: US 12,545,506 B2
(45) Date of Patent: Feb. 10, 2026

(54) SYSTEM FOR ZERO RADIUS DIRECTION CHANGE IN AN INDEPENDENT CART SYSTEM

(71) Applicant: Rockwell Automation Technologies, Inc., Mayfield Heights, OH (US)

(72) Inventors: Yuhong Huang, Acton, MA (US); Daniel I. Lanier, North Billerica, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 253 days.

(21) Appl. No.: 18/535,821

(22) Filed: Dec. 11, 2023

(65) Prior Publication Data

US 2025/0187825 A1    Jun. 12, 2025

(51) Int. Cl.
    *B65G 1/04*     (2006.01)
    *B60L 13/03*    (2006.01)
    *B65G 43/00*    (2006.01)
    *B65G 54/02*    (2006.01)

(52) U.S. Cl.
    CPC ............ *B65G 1/0428* (2013.01); *B65G 43/00* (2013.01); *B65G 54/02* (2013.01); *B60L 13/03* (2013.01)

(58) Field of Classification Search
    CPC ........ B65G 67/22; B65G 54/02; B65G 43/00; B60L 13/03
    USPC ......................................................... 198/805
    See application file for complete search history.

(56) References Cited

U.S. PATENT DOCUMENTS

| 4,671,185 | A  |   | 6/1987  | Anderson et al. |
|-----------|----|---|---------|-----------------|
| 5,180,048 | A  | * | 1/1993  | Kawada ............ H01L 21/67715 |
|           |    |   |         | 104/282 |
| 9,132,873 | B1 |   | 9/2015  | Laurence et al. |
| 10,717,365| B2 |   | 7/2020  | Huang et al. |
| 10,923,997| B2 |   | 2/2021  | Hoeck et al. |
| 11,584,628| B2 | * | 2/2023  | Orndorff ................ B65G 54/02 |
| 11,628,556| B2 |   | 4/2023  | Balasubramanian et al. |
| 11,851,093| B2 | * | 12/2023 | Desotelle ................ B61L 23/34 |

(Continued)

FOREIGN PATENT DOCUMENTS

EP          2786946 A1     10/2014

OTHER PUBLICATIONS

Magnemotion, Inc., a Rockwell Automation Company; "QuickStick 100 User Manual"; DIR 990000460—www.rockwellautomation.com; Rockwell Automation Publication MMI-UM006G-EN-P—Jan. 2020—(232) pages.

*Primary Examiner* — James R Bidwell
(74) *Attorney, Agent, or Firm* — Boyle Fredrickson, S.C.

(57) ABSTRACT

A system for zero radius direction changes in an independent cart system includes a drive magnet array movably mounted to a mover. The drive magnet array includes at least one drive magnet configured to engage an electromagnetic field generated by coils extending along a track and a first engagement member for selectively positioning the drive magnet array between at least a first position and a second position. A switch track segment defines at least a first and second path for the mover. The first path includes coils to generate the electromagnetic field along the first path, and the second path includes coils to generate the electromagnetic field to along the second path. The drive magnet array is aligned with the first path when the drive magnet array is in the first position and with the second path when the drive magnet array is in the second position.

20 Claims, 18 Drawing Sheets

(56) References Cited

U.S. PATENT DOCUMENTS

| | | | |
|---|---|---|---|
| 12,103,402 B2* | 10/2024 | Huang | B60L 15/005 |
| 2016/0380562 A1* | 12/2016 | Weber | B60L 13/003 |
| | | | 310/12.11 |
| 2019/0389675 A1* | 12/2019 | Kleinikkink | H02K 11/0141 |
| 2021/0354935 A1* | 11/2021 | Kleinikkink | H02K 41/031 |

* cited by examiner

SYSTEM FOR ZERO RADIUS DIRECTION CHANGE IN AN INDEPENDENT CART SYSTEM

BACKGROUND INFORMATION

The subject matter disclosed herein relates to providing a zero radius direction change for a vehicle in an independent cart system. More specifically, drive magnets mounted on each vehicle as part of the linear drive system may be oriented in multiple directions to selectively interact with drive coils similarly mounted in multiple directions on a switch segment.

Motion control systems utilizing independent cart technology employ a linear drive system embedded within a track and multiple vehicles, also referred to as "movers" or carts, that are propelled along the track via the linear drive system. Movers and linear drive systems can be used in a wide variety of processes (e.g. packaging, manufacturing, and machining) and can provide an advantage over conventional conveyor belt systems with enhanced flexibility, extremely high-speed movement, and mechanical simplicity. The independently controlled movers or carts are each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers. Each of the movers may be independently moved and positioned along the track in response to the electromagnetic fields generated by the coils.

In some applications, multiple tracks are present, and a mover may be required to transition from one track to another. Historically, it has been known to provide a switch to control movement of a mover between tracks. A switch may include a single input path and multiple output paths, multiple input paths and a single output path, or multiple input and multiple output paths. With a single input path and multiple output paths, one of the output paths may provide continuous movement in a straight path from the input path. One or more additional paths may be curved, allowing the mover to travel to the left or right from the input path. The radius of the curve has a minimum bend which is a function of the size of the vehicle travelling along the curved path. As the length of the vehicle increases, the length of the curve similarly increases. The space required in a manufacturing facility for installing a switch must accommodate both the straight and curved paths. The space along a switch, however, is typically not suitable for performing a processing step on a payload as the mover travels through the switch. The space required for a switch, therefore, is underutilized with respect to a manufacturing process served by the independent cart system.

Thus, it would be desirable to provide a system to achieve a zero radius change of direction for a mover in an independent cart system.

BRIEF DESCRIPTION

According to one embodiment of the invention, a system for changing direction in an independent cart system includes a switch track segment arranged between other track segments along which a mover travels. The mover includes a body and a drive magnet array movably mounted to the body. The drive magnet array includes at least one drive magnet and a first engagement member for positioning the drive magnet array. Each track segment includes multiple coils spaced along a length of the track segment. The coils are selectively energized to generate an electromagnetic field that interacts with the drive magnet array to propel the mover along the track segment. The switch track segment includes a first path extending across the switch track segment in a first direction and a second path extending across the switch track segment in a second direction. The first path includes a first plurality of coils to propel the mover along the first path, and the second path includes a second plurality of coils to propel the mover along the second path. The second direction is different than the first direction, and the second path intersects the first path. A second engagement member selectively engages the first engagement member to position the drive magnet array between a first position, aligned with the first path, and a second position, aligned with the second path.

According to another embodiment of the invention, a system for changing direction in an independent cart system includes a mover with a first magnet array mounted on the mover and extending in a first direction on the mover and a second magnet array mounted on the mover and extending in a second direction on the mover. Multiple track segments are provided, where each track segment includes multiple coils spaced along a length of the track segment. The coils are selectively energized to generate an electromagnetic field that interacts with either the first magnet array or the second magnet array to propel the mover along the track segment. The system also includes a bidirectional track segment. The bidirectional track segment includes a first set of coils arranged in a first direction along a first length of the bidirectional track segment and a second set of coils arranged in a second direction along a second length of the bidirectional track segment. The first set of coils are selectively energized to generate an electromagnetic field that interacts with the first magnet array to propel the mover in the first direction along the bidirectional track segment, and the second set of coils are selectively energized to generate an electromagnetic field that interacts with the second magnet array to propel the mover in the second direction along the bidirectional track segment.

According to still another embodiment of the invention, a system for changing direction in an independent cart system includes a drive magnet array and a switch track segment. The drive magnet array is movably mounted to a body of a mover. The drive magnet array includes at least one drive magnet configured to engage an electromagnetic field generated by multiple coils extending along a track for the independent cart system to propel the mover along the track and a first engagement member for selectively positioning the drive magnet array between at least a first position and a second position. The switch track segment defines at least a first and second path for the mover. The first path includes a first set of coils to generate the electromagnetic field to propel the mover along the first path, and the second path includes a second set of coils to generate the electromagnetic field to propel the mover along the second path. The drive magnet array is aligned with the first path when the drive magnet array is in the first position, and the drive magnet array is aligned with the second path when the drive magnet array is in the second position.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
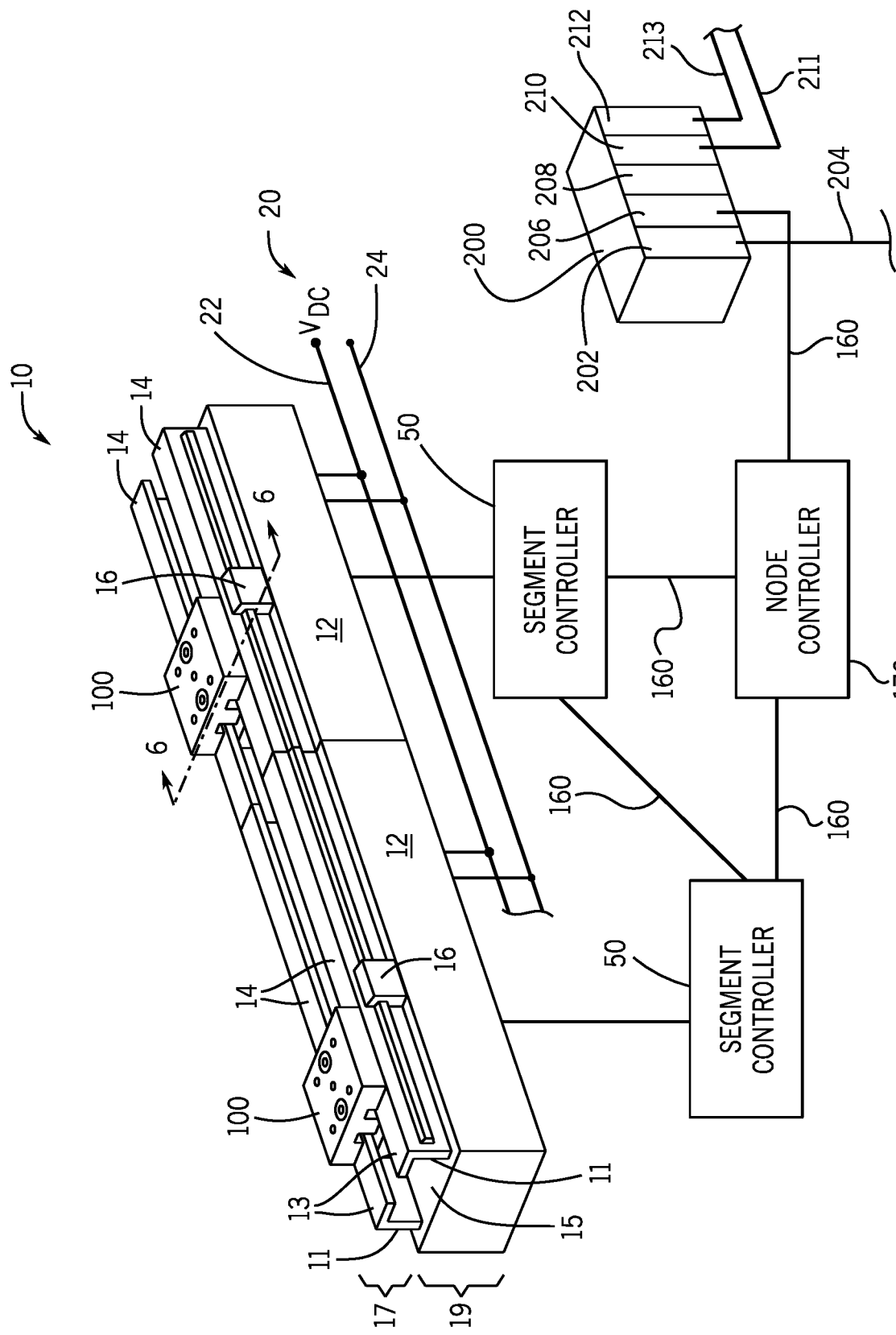
FIG. 1 is a schematic representation of an exemplary control system for an independent cart system according to one embodiment of the invention.
Figure 2:
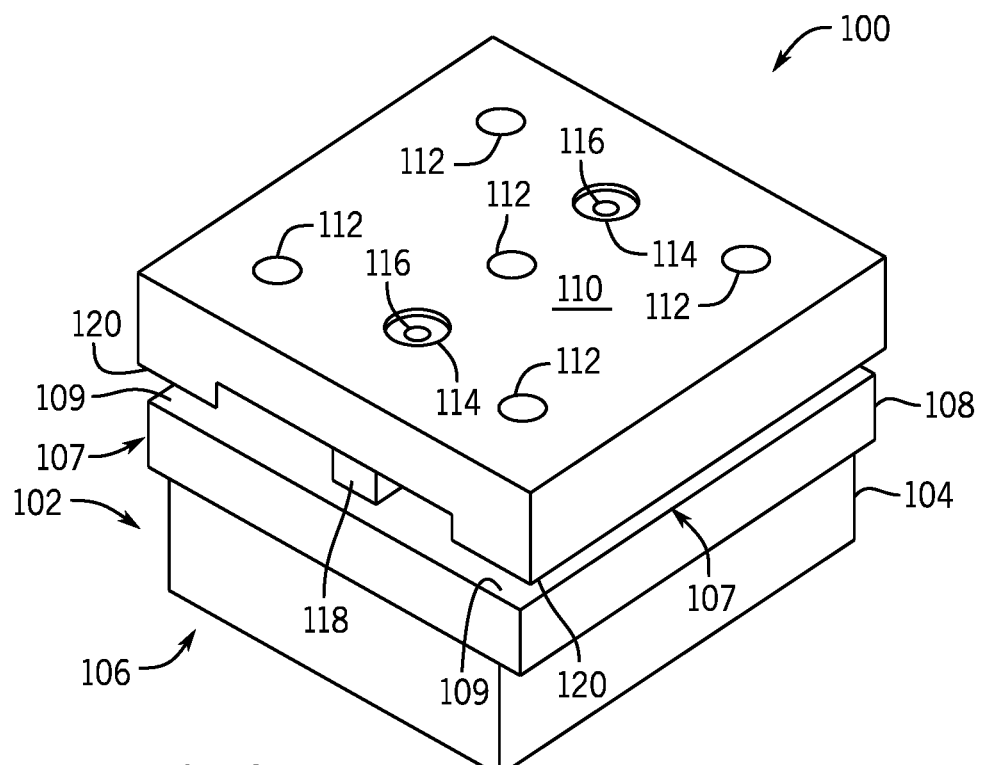
FIG. 2 is a perspective view of one embodiment of a mover configured to travel along the track of FIG. 1.
Figure 3:
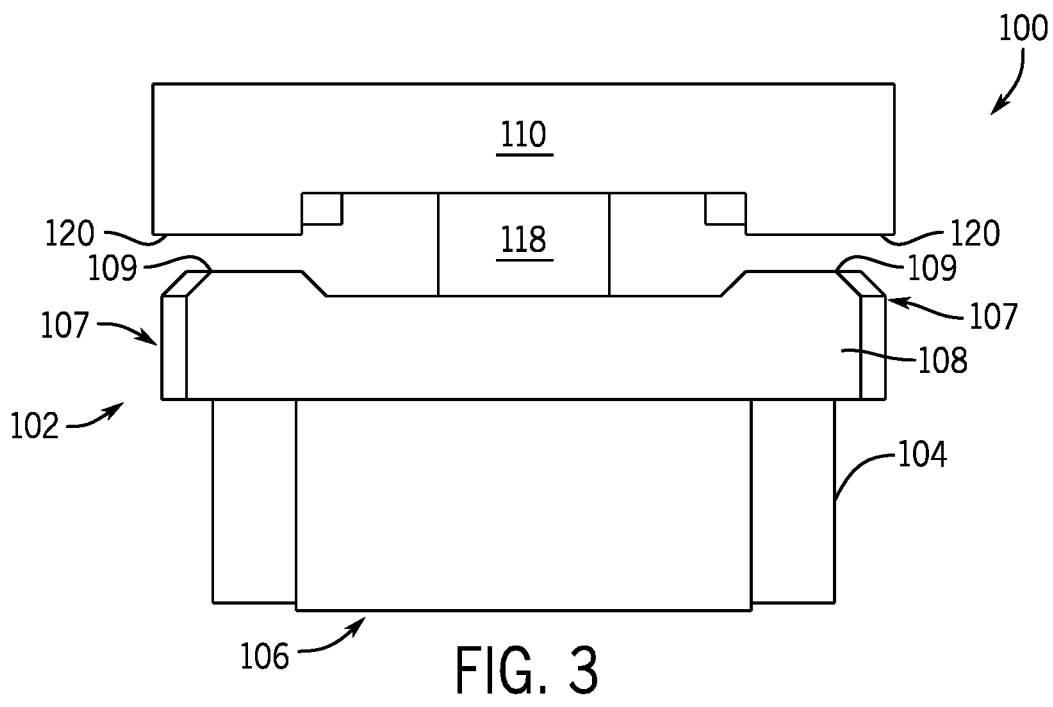
FIG. 3 is a front elevational view of the mover of FIG. 2.
Figure 4:
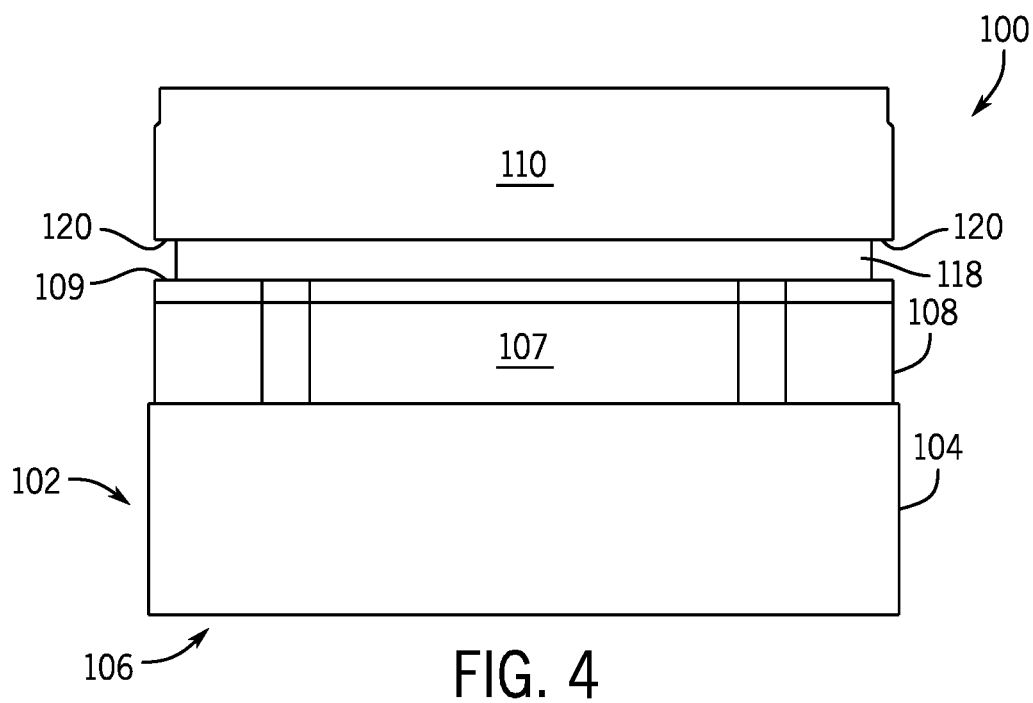
FIG. 4 is a side elevational view of the mover of FIG. 2.
Figure 5:
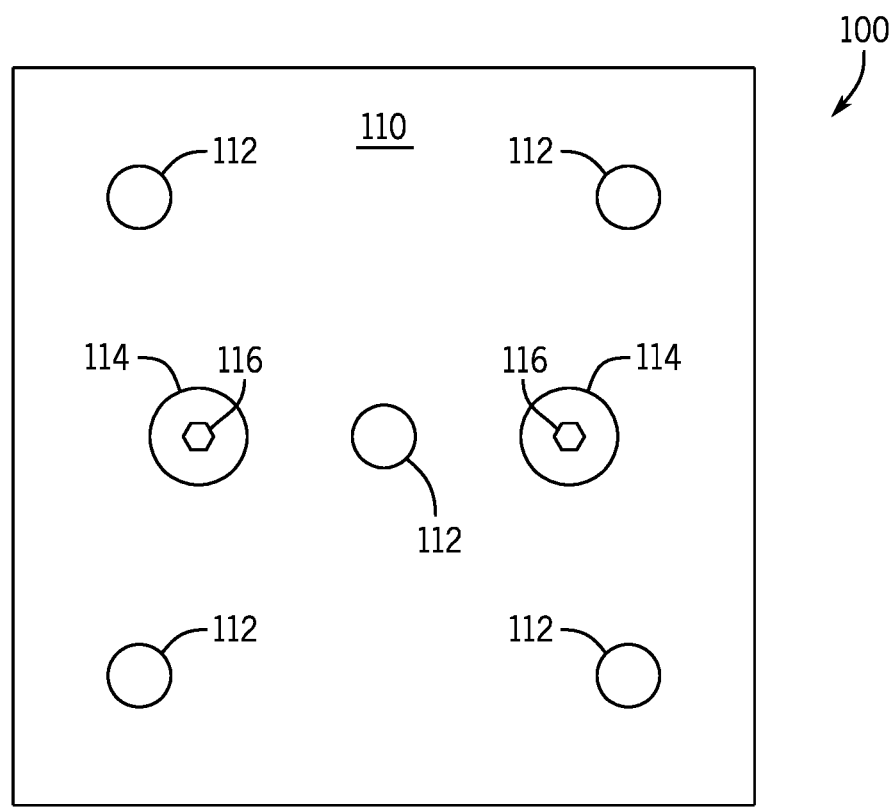
FIG. 5 is a top plan view of the mover of FIG. 2.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system to achieve a zero radius change of direction for a mover in an independent cart system. The independent cart system includes a track with multiple track segments and multiple movers configured to travel along the track. Standard track segments are configured to provide for either unidirectional or bidirectional motion along a single path. A switch track segment is configured to connect standard track segments defining different paths for the mover. The switch track segment interacts with the mover to selectively direct the mover along each of the different paths provided for the mover.

According to a first embodiment of the invention, a mover includes a rotating magnet array mounted on the mover. The rotating magnet array is movable between at least a first position and a second position. In the first position, the magnet array is aligned with at least one first track segment, and in the second position, the magnet array is aligned with at least one second track segment. According to one aspect of the invention, the mover may be powered and include an actuator to selectively position the rotating magnet array in either the first or second position. According to another aspect of the invention, the magnet array may include a first engagement member and the switch track segment may include a second engagement member. The second engagement member on the switch track segment selectively engages the first engagement member when the mover is present on the switch track segment, and the second engagement member is actuated to selectively position the rotating magnet array in either the first or second position. Coils are provided on the switch track segment aligned with each path provided for the mover to engage the magnets in the magnet array and propel the mover along each path.

According to a second embodiment of the invention, a mover includes a complex magnet array mounted on the mover. The complex magnet array includes magnets aligned in different orientations along a length of the mover. The complex magnet array includes at least a first set of magnets aligned along a length of the mover in a first direction and a second set of magnets aligned along a length of the mover in a second direction. When the mover travels onto the switch track segment, coils are provided on the switch track segment and aligned with each path provided for the mover. The paths for each mover correspond to either the first or second set of magnets. Therefore, a first set of coils are selectively energized to engage the first set of magnets in the complex magnet array to drive the mover onto the switch track segment along the first direction, and a second set of coils are selectively energized to engage the second set of magnets in the complex magnet array to drive the mover off the switch track segment along the second direction.

Turning initially to FIG. 1, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes, right-hand switches, left-hand switches, and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a pair of rails 14 extending longitudinally along the upper portion 17 of each track segment 12 and defining a channel 15 between the two rails. Clamps 16 affix to the sides of the rails 14 and secure the rails 14 to the lower portion 19 of the track segment 12. Each rail 14 is generally L-shaped with a side segment 11 extending in a generally orthogonal direction upward from the lower portion 19 of the track segment 12, and a top segment 13 extending inward toward the opposite rail 14. The top segment 13 extends generally parallel to the lower portion 19 of the track segment 12 and generally orthogonal to the side segment 11 of the rail 14. Each top segment 13 extends toward the opposite rail 14 for only a portion of the distance between rails 14, leaving a gap between the two rails 14. The gap and the channel 15 between rails 14 define a guideway along which the movers 100 travel.

According to one embodiment, the surfaces of the rails 14 and of the channel 15 are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the mover 100 such that they may be replaced if the wear exceeds a predefined amount. According to still other embodiments, the movers 100 may include low-friction rollers 122, 124 (See e.g., FIGS. 11-15) to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

Turning next to FIGS. 2-5, one embodiment of the mover 100 is configured to slide along the channel 15 as it is propelled by a linear drive system. The mover 100 includes a body 102 configured to fit within the channel 15. The body 102 includes a lower portion 104, configured to hold magnets 130 (see also FIG. 6), and an upper portion 108, configured to engage the rails 14. The lower portion has a lower surface 106 to slide along the bottom surface of the channel 15. The upper portion 108 includes side contacting surfaces 107 which slide along an interior surface of the side segments 11 of the rails 14 and upper contacting surfaces 109 which slide along an interior surface of the top segments 13 of the rails 14. The mover 100 also includes a platform 110 mounted to the body 102 of the mover. An upper surface of the platform 110 includes multiple threaded openings 112 to which a fixture, or workpiece, may be mounted. Various workpieces, clips, fixtures, and the like may be mounted on the top of each platform 110 for engagement with a product to be carried along the track by the mover 100 according to an application's requirements. The platform 110 also includes a pair of openings 114 through which a threaded fastener 116 such as a bolt may be used to secure the platform 110 to the body 102 of the mover 100. A central guide portion 118 of the platform 110 extends downward toward the body 102 of the mover 100. The central guide portion 118 has a width less than the gap between the two rails 14 and fits within the gap between rails when the mover 100 is mounted on the track. The central guide portion 118 also extends further than lower contacting surfaces 120 on the platform 110 creating a gap between the upper contacting surfaces 109 of the body 102 and the lower contacting surfaces 120 of the platform 110 equal to the width of the top segment 13 of the rails 14 such that the lower contacting surfaces 120 of the platform 110 slide along an exterior surface of the top segments 13 of the rails. According to the illustrated embodiment, the platform 110 is generally square and has a sectional area similar to the sectional area of the body 102 as viewed from the top of the mover 100. It is contemplated that platforms 110, or attachments, of various shapes may be secured to the body 102.

Figure 10:
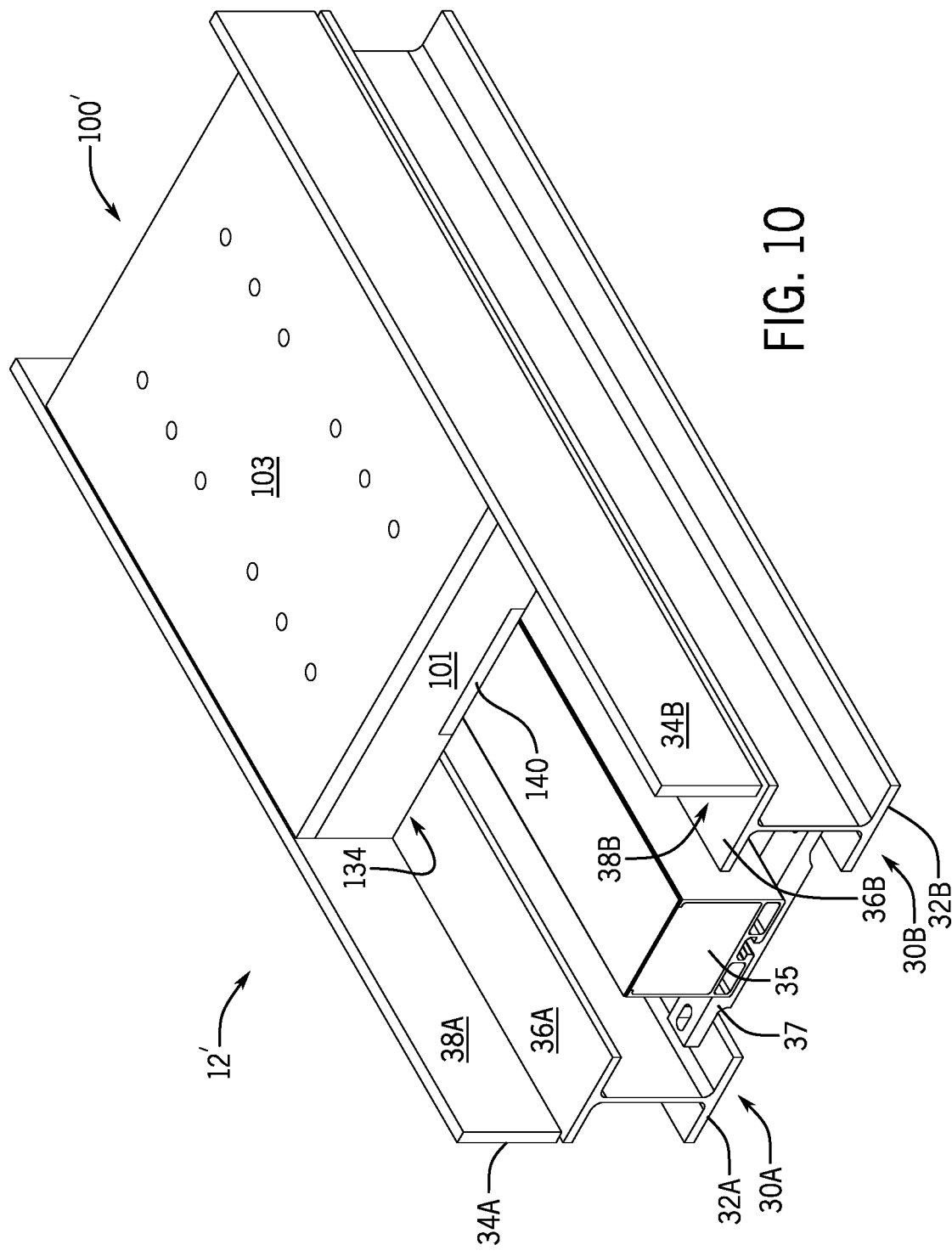
FIG. 10 is a is a perspective view of another embodiment of a mover and track segment of the independent cart transport system.

Referring next to FIG. 10, an alternate embodiment of a mover 100' and track segment 12' are illustrated. According to the embodiment illustrated in FIG. 10, each track segment 12' includes a first rail 30A and a second rail 30B. Each rail 30A, 30B includes a structural segment 32A, 32B and a guiding segment 34A, 34B. The illustrated structural segment 32 is an I-beam, and the illustrated guiding segment 34 is a metal side rail extending upward from the I-beam. By manufacturing each rail 30 independently, the independent cart system may easily be configured to accept movers 100' having different widths. The rails 30 are mounted in parallel along a desired path and at a desired spacing for the movers 100' according to an application's requirements. A series of mounting brackets 37 span the distance between the two rails 30 and a control module 35 is mounted on the mounting brackets 37. The control module 35 includes the coils 150 and a segment controller 50 for each track segment 12 mounted within the control module 35.

The mover 100' is configured to slide along an upper surface 36A, 36B of each I-beam 32A, 32B and is guided along the track by the inner surface 38A, 38B of each guiding segment 34A, 34B. The contacting surfaces of the movers 100' may be planar and made of a low friction material. It is contemplated that the surface may be, for example, nylon, Teflon®, aluminum, stainless steel and the like. In order to reduce sliding friction, it is contemplated that a sliding surface may protrude from the bottom of each mover 100' at the front and rear of each mover and along each side of the mover. The sliding surface may be, for example, a curved surface with a low profile, raising the mover 100' up a few millimeters to a few centimeters. The four sliding surfaces provide minimal contact with the top surface 36 of each I-beam, reducing the friction between the mover 100' and the I-beam. Similarly, one or more sliding surfaces may protrude from each side of the mover 100' to contact the side rails 34, reducing the friction between the mover 100' and each side rail. According to the illustrated embodiment, the mover 100' includes a body portion 101 and a mounting plate 103. The body portion 101 includes the drive member, such as the drive magnet array 140, and any on-board control elements within the mover 100'. The mounting plate 103 is attached to the top of the body portion 101 and may be configured to include a fixture, or fixtures, for a payload to be mounted on the mover 100', tooling for interaction with a target external to the mover, or other sensors, actuators, and the like according to the application requirements. Connectors may be provided between the body 101 and the mounting plate 103 to provide control signals and/or feedback signals between the body 101 and the mounting plate 103. The drive magnet array 140 is mounted along a bottom, drive surface 134 of the mover 100' such that they may engage the electromagnetic field generated by the coils 150 as they are energized by the segment controller 50.

Figure 11:
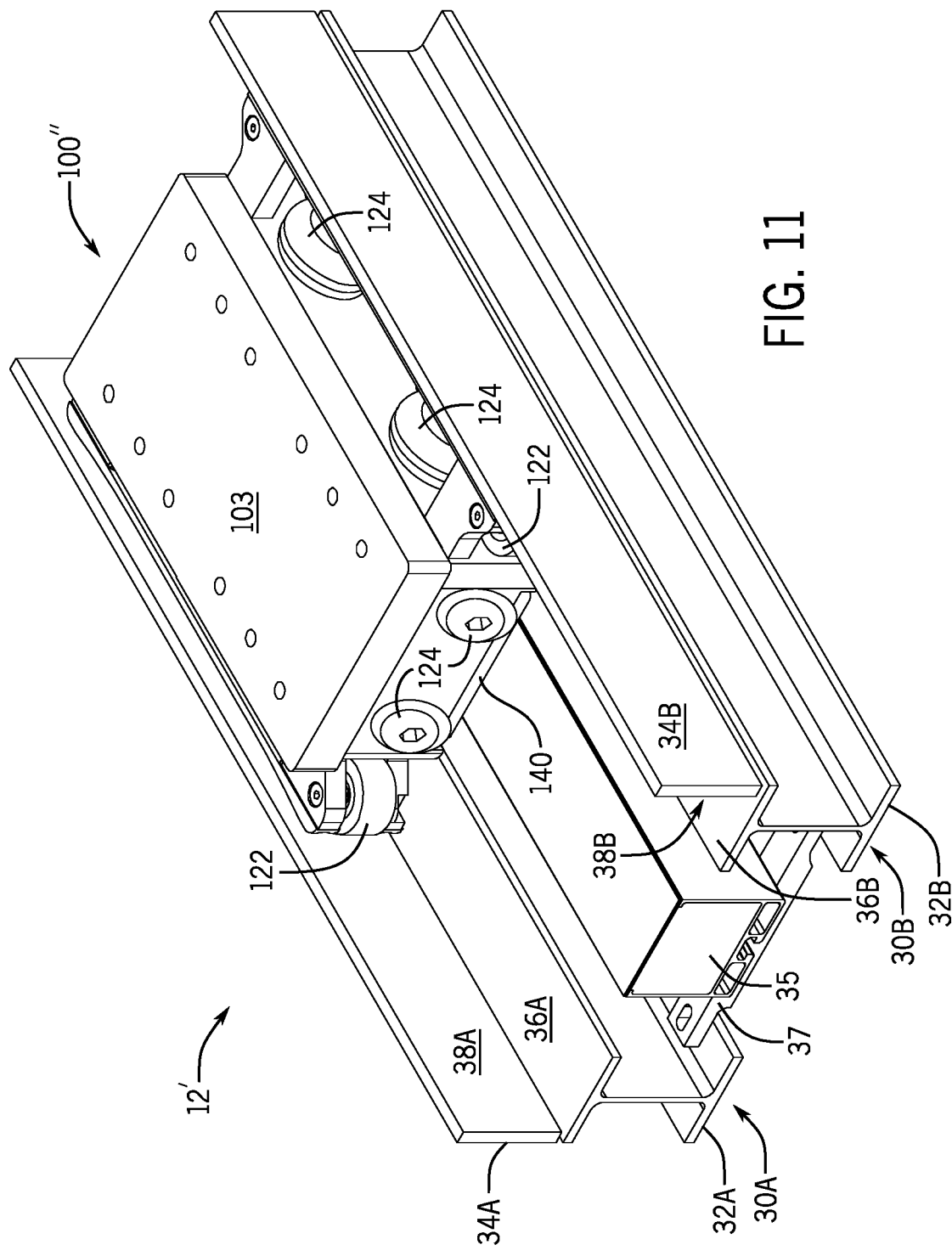
FIG. 11 is a perspective view of still another embodiment of a mover on the track segment shown in FIG. 10 for the independent cart transport system.

Referring next to FIG. 11, still another embodiment of the mover 100" is illustrated. The mover 100" shown in FIG. 11 is configured to ride along the track segment 12' illustrated in FIG. 10. Rather than sliding along the upper surfaces 36A, 36B and between the inner surfaces 38A, 38B of each side rail 34A, 34B, the mover 100" includes wheels 122, 124 configured to roll along the surface. A first set of wheels 122 is mounted horizontally and is configured to engage the inner surfaces 38A, 38B of each side rail 34A, 34B. A second set of wheels 124 is mounted vertically and is configured to engage the upper surfaces 36A, 36B of each rail 30A, 30B. As will be discussed in more detail below, the drive magnet array 140 is configured to be positioned in at least two different directions. A portion of the second set of wheels 124 are mounted on each side of the mover 100". According to the illustrated embodiment, two vertical wheels 124 are mounted on each side. When the mover 100 is travelling in a forward and reverse direction, the two wheels 124 on each side engage the upper surfaces 36A, 36B of the track, and the two wheels 124 on each end are suspended in the gap between rails 30. When the mover 100 is travelling in a side-to-side direction, the two wheels 124 on each end engage the upper surfaces 36A, 36B of the track, and the two wheels 124 on each side are suspended in the gap between rails 30.

Figure 12:
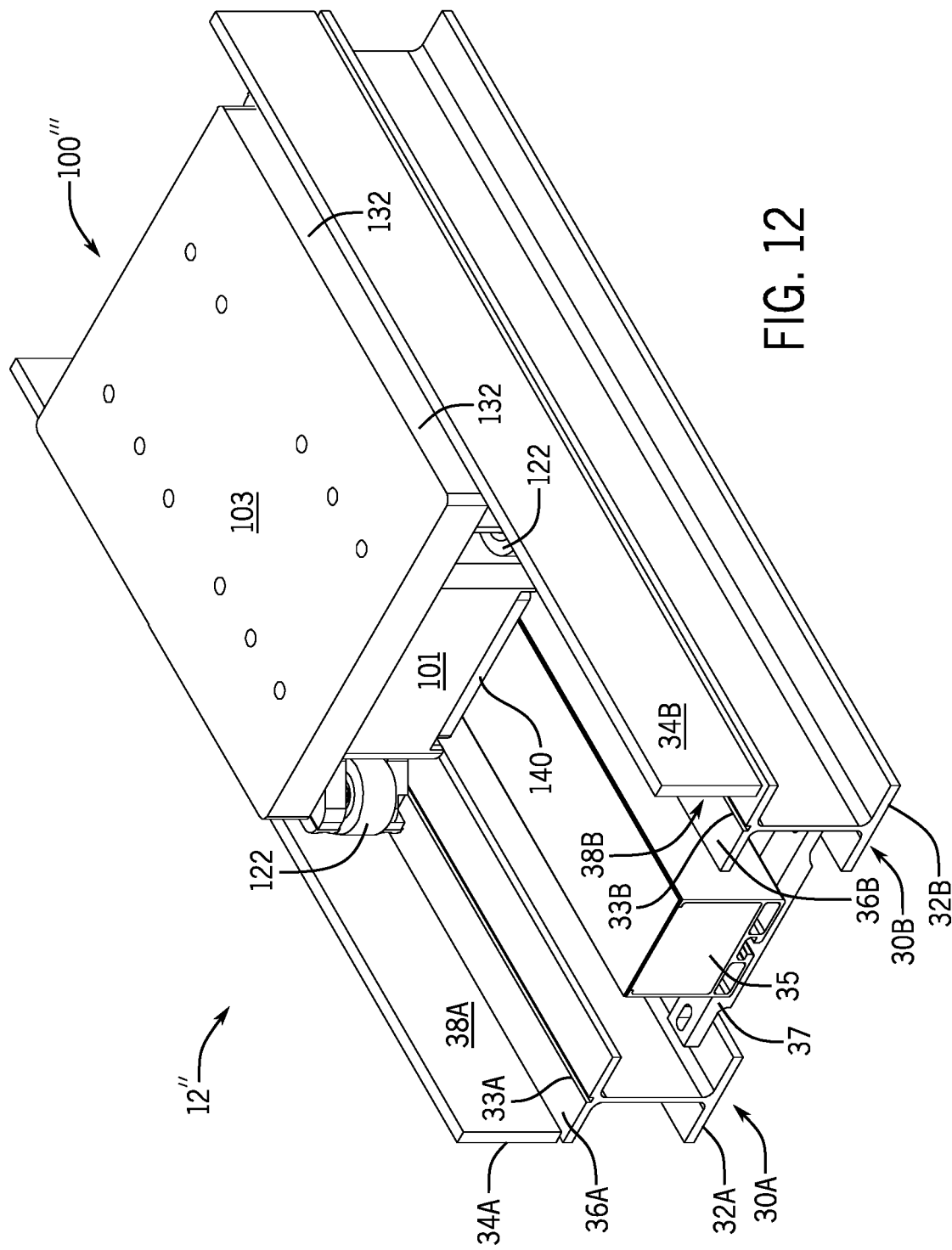
FIG. 12 is a perspective view of yet another embodiment of a mover on the track segment shown in FIG. 10 for the independent cart transport system.
Figure 13:
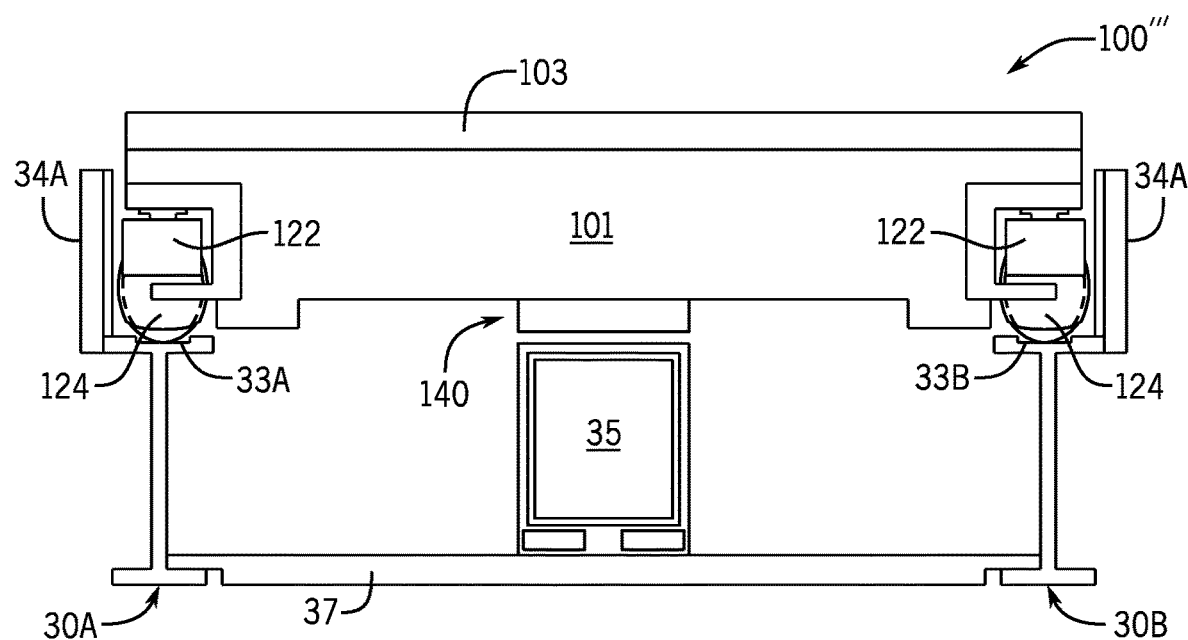
FIG. 13 is a front elevation view of the mover and track shown in FIG. 12.
Figure 14:
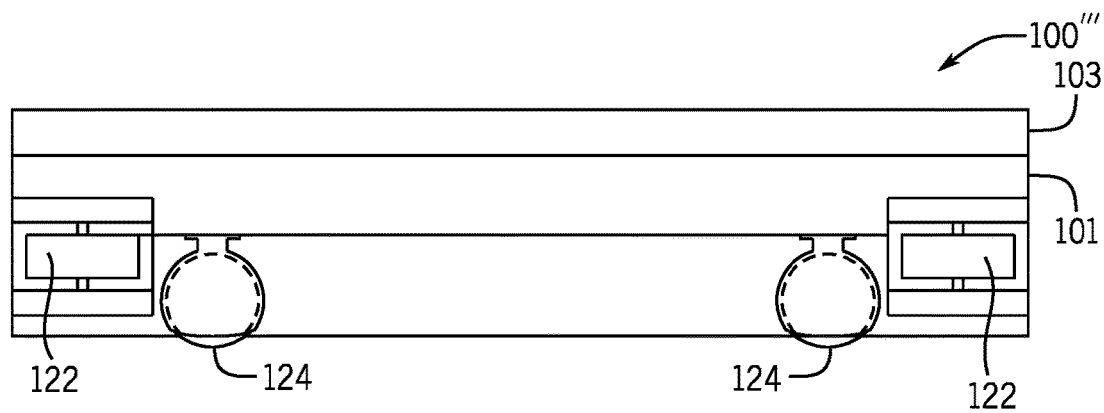
FIG. 14 is a side elevation view of the mover of FIG. 12.
Figure 15:
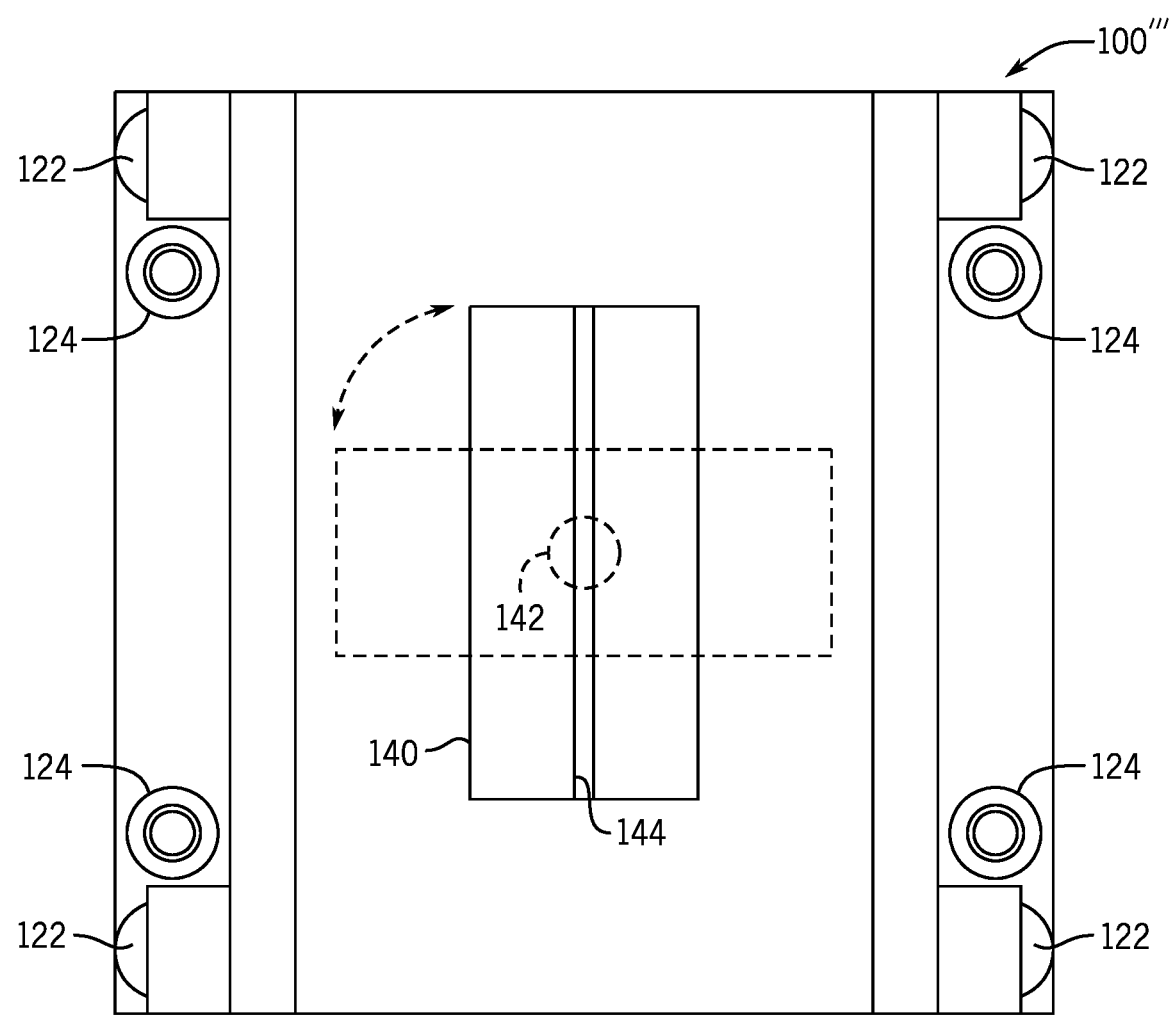
FIG. 15 is a bottom plan view of the mover of FIG. 12.
Figure 16:
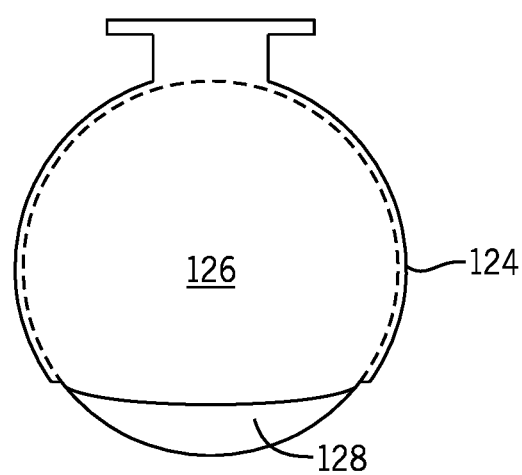
FIG. 16 is a side elevation view of a spherical wheel on the mover of FIG. 12.

Referring next to FIGS. 12-15, yet another embodiment of the mover 100''' is illustrated. The mover 100''' shown in FIG. 12 is configured to ride along a track segment 12" similar to the track segment 12' illustrated in FIG. 10. Rather than sliding along the upper surfaces 36A, 36B and between the inner surfaces 38A, 38B of each rail 30A, 30B, the mover 100" includes wheels 122, 124 configured to roll along the surfaces. A first set of wheels 122 is mounted horizontally to each mover and is configured to engage the inner surfaces 38A, 38B of each guiding segment 34A, 34B. A second set of wheels 124 is configured to engage the upper surfaces 36A, 36B of each rail 30A, 30B. Each wheel 124 in the second set of wheels is configured to be a multidirectional wheel. According to the illustrated embodiment, each multidirectional wheel 124 in the second set of wheels is a spherical wheel. With reference also to FIG. 16, the spherical wheel 124 includes a housing 126 and a wheel 128 configured to rotate in any direction within the housing 126. According to other aspects of the invention, the multidirectional wheel 124 may be a mecanum wheel, an omni wheel, or any other suitable wheel configured to provide motion in any direction. The upper surfaces 36A, 36B of each rail 30A, 30B include a channel 33A, 33B in the surface in which the multidirectional wheel runs. According to a first aspect of the invention, the channels 33A, 33B may act in conjunction with the side rails 34A, 34B to guide each mover 100''' along a desired path of operation.

According to another aspect of the invention, the channels 33A, 33B may act independently without side rails 34A, 34B to guide each mover 100''' along a desired path of operation. For example, in a warehouse or manufacturing facility, multiple paths may be defined along a floor of the warehouse or manufacturing facility. The paths each include control modules 35 inset within the floor such that coils 150 are located at or just below the level of the floor. The electromagnetic field generated by the coils 150 may interact with the magnet array 140 on each mover. Channels 33A, 33B may be formed in the floor parallel to and offset from the control modules 35 providing a guide to the multidirectional wheels 124. The paths may intersect at switch track segments 312 (see also FIG. 18), as discussed in more detail below. When the paths intersect, the control module present in a switch track segment 312 may direct the mover 100''' along either of the intersecting paths.

Figure 6:
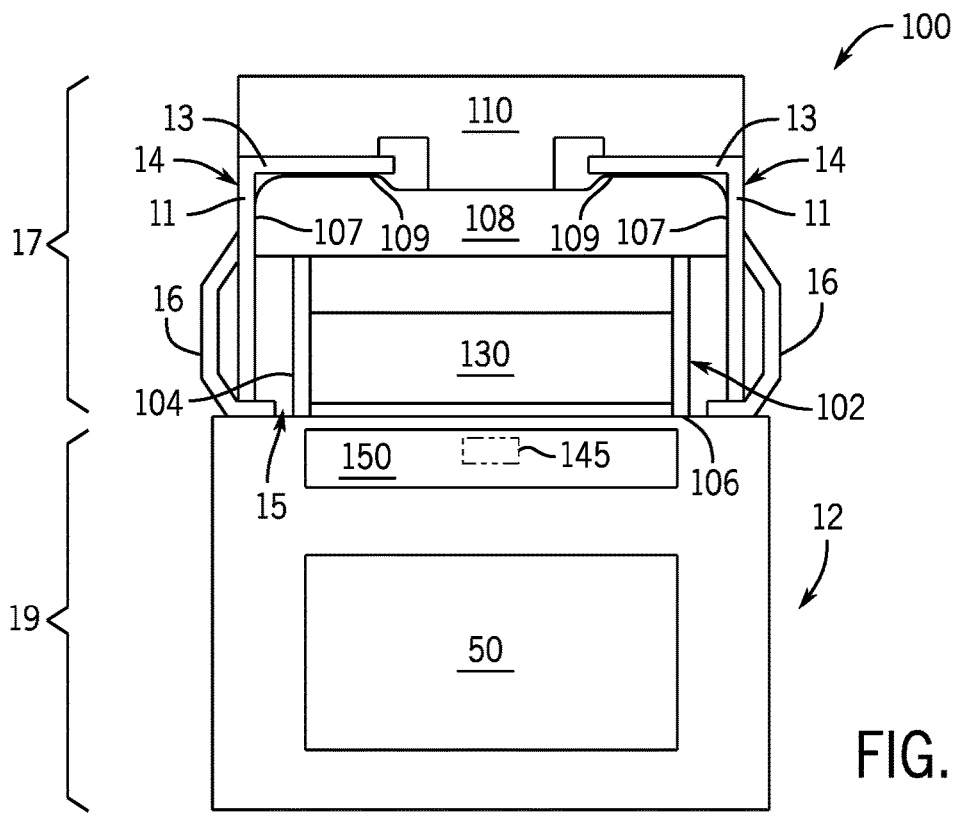
FIG. 6 is a sectional view of one embodiment of a mover and track segment included in the linear drive system taken at 6-6 of FIG. 1.
Figure 7:
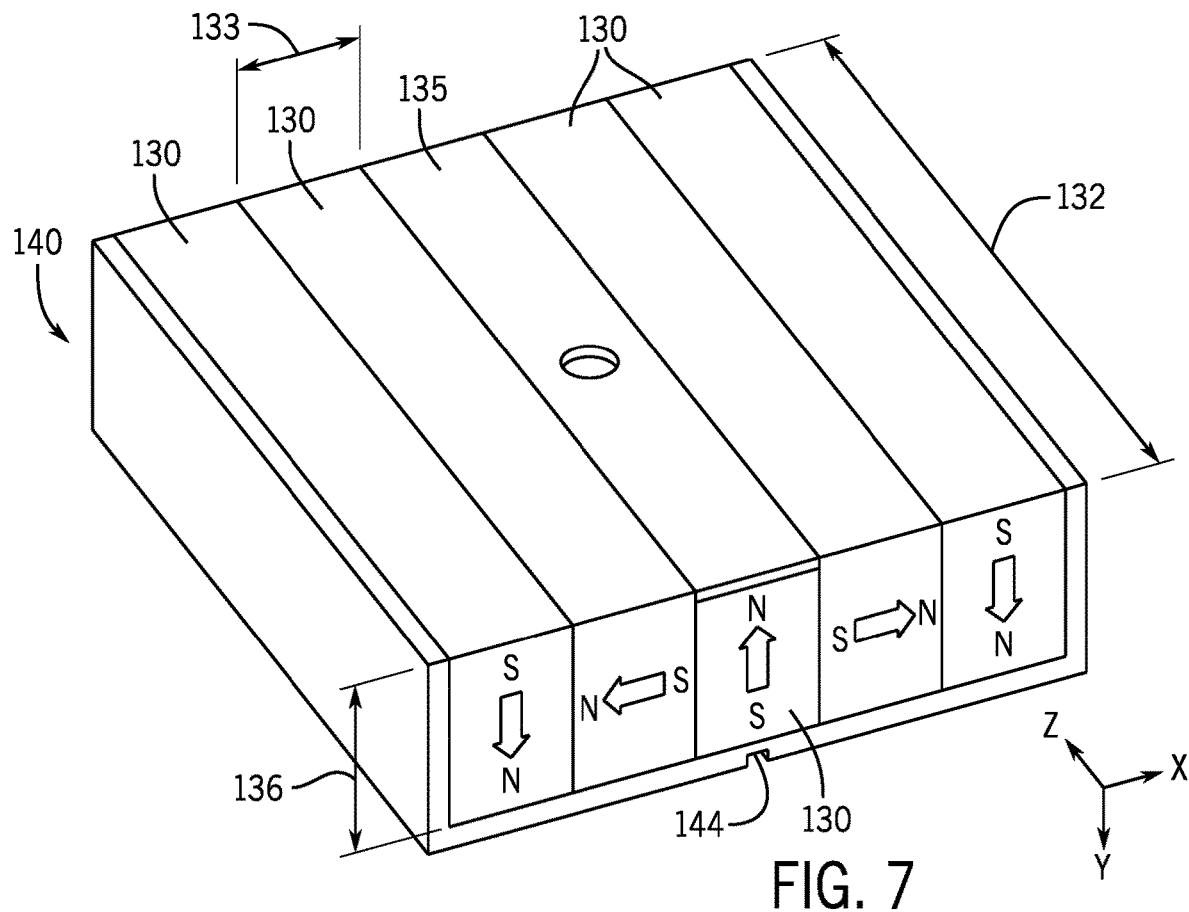
FIG. 7 is a perspective view of one embodiment of a magnet array used within the mover of FIG. 10.

The mover 100 is carried along the track 10 by a linear drive system. The linear drive system is incorporated in part on each mover 100 and in part within each track segment 12. One or more drive magnets 130 are mounted to each mover 100. With reference to FIG. 6, the drive magnets 130 are arranged in a magnet array 140 on the lower surface of each mover. With reference also to FIG. 7, the illustrated embodiment includes five drive magnets 130 placed adjacent to each other in a Halbach array to define the block of magnets. Each magnet 130 has a length 132 extending in the z-axis, a width 133 extending in the x-axis, and a height 136 extending in the y-axis. As will be discussed in more detail below, each magnet 130 in the magnet array 140 may have identical lengths 132, widths 133, and heights 136 or, alternately, one or more of the magnets 130 may have a length 132, width 133, or height 136 that is different than the other magnets. From left-to-right in FIG. 11, a first drive magnet 130 has a north pole oriented along a y-axis toward the track when the mover 100 is mounted on the track. A second drive magnet 130 has a north pole oriented along an x-axis, and a third drive magnet 130 has a north pole oriented along the y-axis away from the track. A fourth drive magnet 130 has a north pole oriented along the x-axis in a direction opposite the second magnet, and a fifth drive magnet 130 has the north pole again oriented toward the track along the y-axis. As also illustrated, an orientation of the magnetic field is illustrated by the arrow pointing from the south pole toward the north pole. For movers 100 having a greater length, this rotation of the orientation for the drive magnets 130 may continue along the length of the mover 100. The Halbach array configuration has an advantage of cancelling magnetic flux tending to extend upward into the rest of the mover 100 while increasing the magnetic flux tending to extend downward toward the track for interaction with the linear drive system. The illustrated embodiment for the arrangement of drive magnets 130 is not intended to be limiting. Various other configurations of the drive magnets 130 may be utilized as non-illustrated embodiments of the invention.

Figure 8:
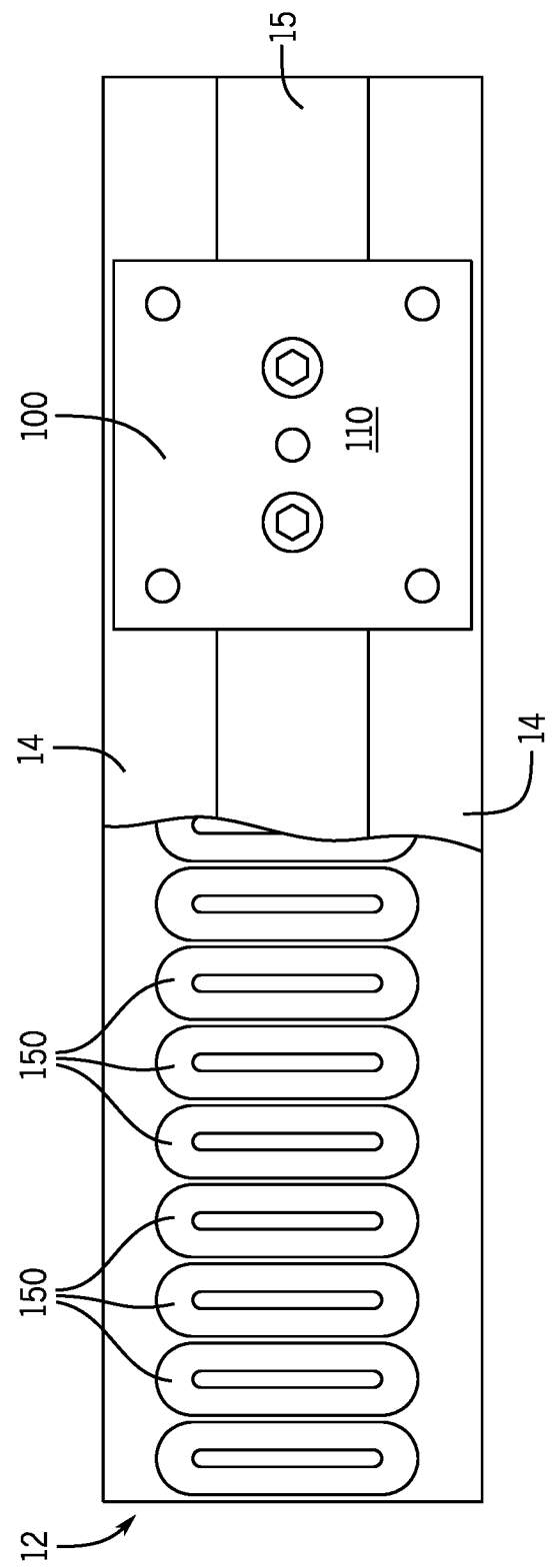
FIG. 8 is a partial top cutaway view of the mover and track segment of FIG. 1.

The linear drive system further includes a series of coils 150 spaced along the length of the track segment 12. With reference also to FIG. 8, the coils 150 may be positioned within a housing for the lower portion 19 of the track segment 12 and below the surface of the channel 15. The coils 150 are energized sequentially according to the configuration of the drive magnets 130 present on the movers 100. The sequential energization of the coils 150 generates a moving electromagnetic field that interacts with the magnetic field of the drive magnets 130 to propel each mover 100 along the track segment 12.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 6, it is contemplated that each segment controller 50 may be mounted in the lower portion 19 of the track segment 12. Each segment controller 50 is in communication with a node controller 170 which is, in turn, in communication with an industrial controller 200. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the node controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a node controller 170 where the node controller 170 operates to generate commands for each segment controller 50.

Figure 9:
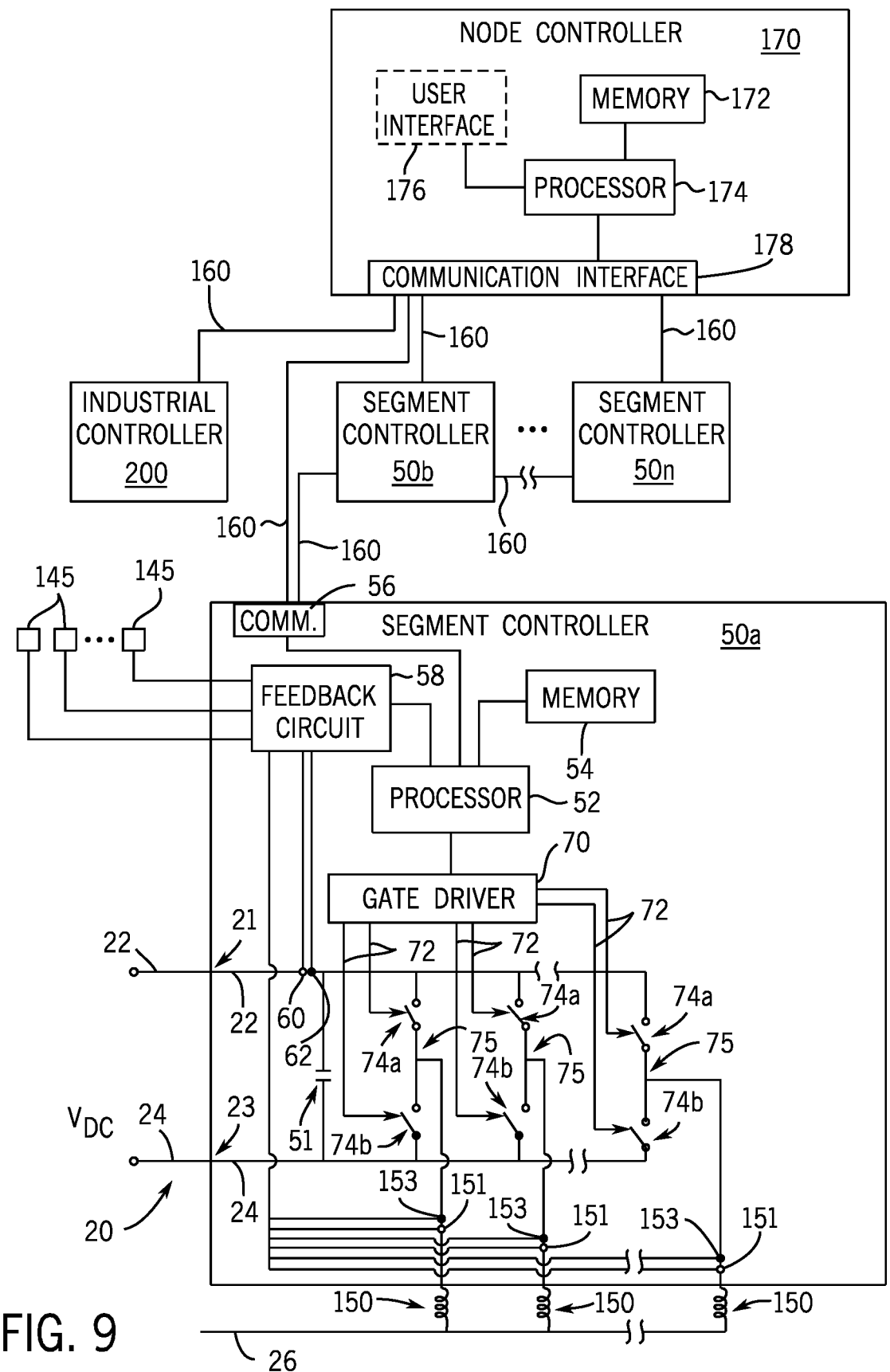
FIG. 9 is a block diagram representation of the exemplary control system of FIG. 1.

With reference also to FIG. 9, the node controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the node controller 170 and to load or configure desired motion profiles for the movers 100 on the node controller 170. Optionally, the configuration may be performed via a remote device connected via a network and a communication interface 178 to the node controller 170. It is contemplated that the node controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the node controller 170 and user interface may be an industrial computer mounted within a control cabinet and configured to withstand harsh operating environments. It is contemplated that still other combinations of computing devices and peripherals as would be understood in the art may be utilized or incorporated into the node controller 170 and user interface 176 without deviating from the scope of the invention.

The node controller 170 includes one or more programs stored in the memory device 172 for execution by the processor 174. The node controller 170 receives a desired position from the industrial controller 200 and determines one or more motion profiles for the movers 100 to follow along the track 10. A program executing on the processor 174 is in communication with each segment controller 50 on each track segment via a network medium 160. The node controller 170 may transfer a desired motion profile to each segment controller 50. Optionally, the node controller 170 may be configured to transfer the information from the industrial controller 200 identifying one or more desired movers 100 to be positioned at or moved along the track segment 12, and the segment controller 50 may determine the appropriate motion profile for each mover 100. Various features of the present application will be discussed herein as being executed within the segment controller 50, the industrial controller 200, and the node controller 170. As illustrated in FIGS. 1 and 9, these controllers are interconnected by the network media 160. According to other, non-illustrated embodiments of the invention, various features discussed herein as implemented on one of the controllers 50, 200, 170 may be implemented on another controller with communication via the network media 160 transmitting data required to perform the functions between the various controllers.

A position feedback system provides knowledge of the location of each mover 100 along the length of the track segment 12 to the segment controller 50. According to one embodiment of the invention, the position feedback system includes one or more position magnets mounted to the mover 100. According to another embodiment of the invention, illustrated in FIGS. 10 and 14, the position feedback system utilizes the drive magnets 130 as position magnets. Position sensors 145 are positioned along the track segment 12 at a location suitable to detect the magnetic field generated by the drive magnets 130. According to the illustrated embodiment, the position sensors 145 are located below or interspersed with the coils 150. The sensors 145 are positioned such that each of the drive magnets 130 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The position sensors 145 are spaced apart along the length of the track. According to one aspect of the invention, the position sensors 145 are spaced apart such that adjacent position sensors 145 generate a feedback signal which is offset from each other by ninety electrical degrees (90°). Multiple position sensors 145 are, therefore, generating feedback signals in tandem for a single mover 100 as the mover is travelling along the track 10. The feedback signals from each position sensor 145 are provided to a feedback circuit 58 which, in turn, provides a signal to the processor 52 corresponding to the magnet 130 passing the sensor 145.

The segment controller 50 also includes a communication interface 56 that receives communications from the node controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately provide positive or negative voltages to one the coils 150.

The power section in each segment controller 50 may include multiple legs, where each leg is connected in parallel between the positive rail 22 and the negative rail 24. According to the illustrated embodiment, three legs are shown. However, the number of legs may vary and will correspond to the number of coils 150 extending along the track segment 12. Each leg includes a first switching device 74a and a second switching device 74b connected in series between the positive rail 22 and the negative rail 24 with a common connection 75 between the first and second switching devices 74a, 74b. The first switching device 74a in each leg may also be referred to herein as an upper switch, and the second switching device 74b in each leg may also be referred to herein as a lower switch. The terms upper and lower are relational only with respect to the schematic representation and are not intended to denote any particular physical relationship between the first and second switching devices 74a, 74b. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24.

The processor 52 also receives feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program stored on the memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. The energized coils 150 create an electromagnetic field that interacts with the drive magnets 130 on each mover 100 to control motion of the movers 100 along the track segment 12.

Figure 20:
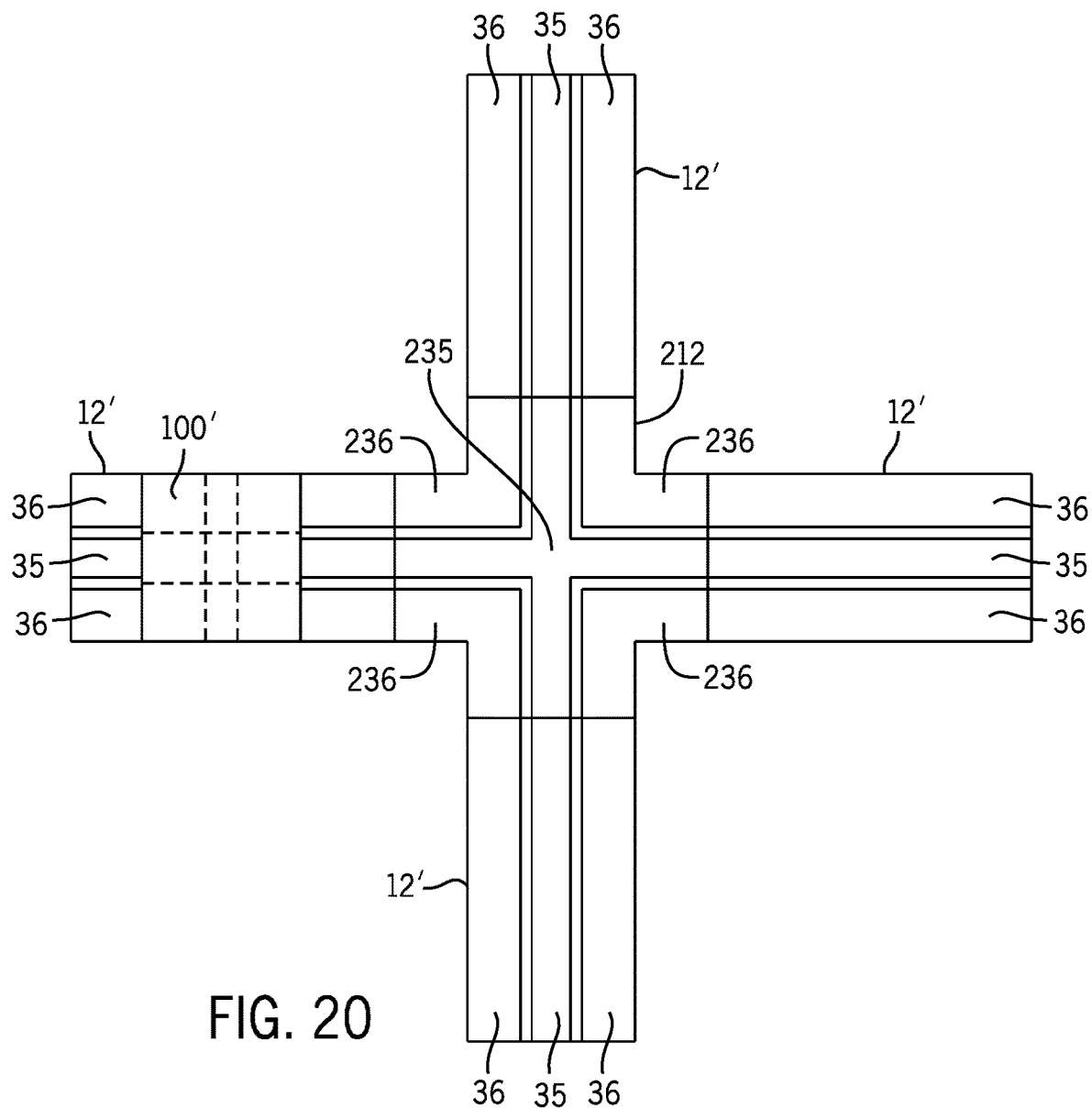
FIG. 20 is a top plan view of a switch track segment connected to other track segments for use with the mover of FIG. 19.

With reference next to FIG. 20, four track segments 12 are illustrated as being connected via a single switch track segment 212. In the illustrated embodiment, a first pair of track segments 12 are arranged in a side-to-side configuration on either side of the switch track segment 212. A first direction of travel between the first pair of track segments 12 defines a first path for the mover 100' across the switch track segment 212. A second pair of track segments 12 are arranged in a top-to-bottom configuration for the switch track segment 212. A second direction of travel between the second pair of track segments 12 defines a second path for the mover 100' across the switch track segment 212. The switch track segment 212 is configured in a similar manner to the track segments 12 discussed above. Each switch track segment 212 includes a segment controller 50 to control the linear drive system and to achieve the desired motion of each mover 100' along the switch track segment 212. The linear drive system includes coils 150 extending in two directions across the switch track segment 212. A first set of coils spans the switch track segment 212 from side-to-side along the first path, and a second set of coils spans the switch track segment 212 from top-to-bottom along the second path. The segment controller 50 for the switch track segment 212 may selectively energize either the first or second set of coils to propel the mover 100' along either the first or second path. The position feedback system includes position sensors 145 arranged along both the first and second paths to provide feedback signals corresponding to position information for the mover 100' along either path.

Figure 19:
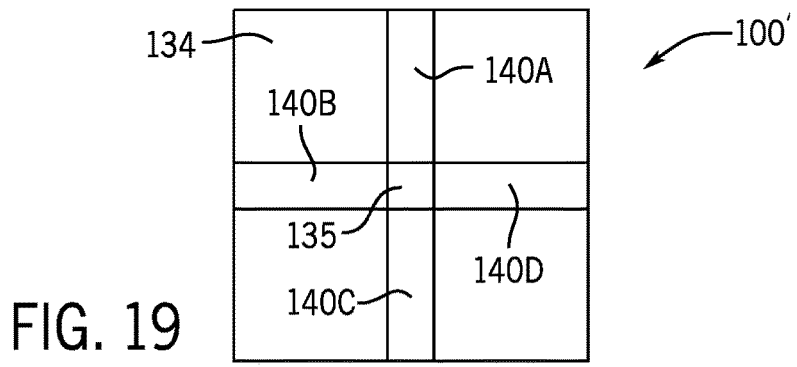
FIG. 19 is a block diagram representation of a drive magnet configuration for another embodiment of the mover in FIG. 10.

In operation, the switch track segments 212 provide a system to achieve a zero radius change of direction for a mover in an independent cart system. According to a first embodiment of the invention, a mover 100' may have multiple magnet arrays 140 mounted on the mover. With reference to FIG. 19, a bottom surface 134 of the mover 100' includes a first magnet array 140A, a second magnet array 140B, a third magnet array 140C, and a fourth magnet array 140D. The first and third magnet arrays 140A, 140C extend from top-to-bottom on the illustrated mover 100', while the second and fourth magnet arrays 140B, 140D extend from side-to-side on the illustrated mover. According to the illustrated embodiment, the central segment 135 of the bottom surface 134 of the mover 100' has no magnet array present. The first and third magnet arrays 140A, 140C are arranged in a complementary manner to define a first magnet array extending in a first direction across the mover 100'. With reference again to FIG. 7, each of the first and third magnet arrays 140A, 140C may define a complete Halbach array and be identical in construction. According to another aspect of the invention, Varying numbers of magnets 130 may be positioned on either side of the central segment 135, and the magnets 130 may continue a sequence from one side to the other side of the central segment. For example, the first magnet array 140A may include three magnets 130 having alternating north and south poles facing downward, forming a N-S-N pattern on one side of the central segment 135. The other side of the central segment 135 may continue the sequence staring with a south pole such that the other side of the central segment 135 may form a S-N-S pattern. Optionally, the patterns may be identical with both sides having a N-S-N or S-N-S pattern such that the segment controller 50 regulates the current in the coils 150 on either side of the centrals segment 135 in an identical manner. Still other configurations of the magnets 130 in the magnet array 140 may be utilized without deviating from the scope of the invention. The second and fourth magnet arrays 140B, 140D are similarly arranged in a complementary manner to each other to define a second magnet array extending in a second direction across the mover 100'. Optionally, either the first and third magnet arrays 140A, 140C or the second and fourth magnet arrays 140B, 140D may be combined into a single, continuous magnet array spanning the entire length of the mover 100' with magnets 130 present in the central segment 135.

With reference also to FIG. 20, the mover 100' is illustrated as approaching the switch track segment 212 from a track segment 12 immediately adjacent to and on the left side of the switch track segment. The upper surface 36 of the rails 30 of the straight track segment 12 are aligned with the upper surface 236 of rails on the switch track segment 212 to provide a continuous surface along which the mover 100' travels. The control module 235 for the switch track segment 212 is in communication with control modules 35 for each track segment 12 connected to the switch track segment and controls coils along each leg of the control module 235 such that the switch track segment 212 provides for continuous motion of the mover 100 between any two of the track segments 12 connected to the switch track segment.

As the mover 100' transitions from the left track segment 12 to the switch track segment 212, the segment controllers 50 for the left track segment 12 and the switch track segment 212 regulate current in the coils 150 to drive the mover 100' to the center of the switch track segment 212. The electromagnetic field generated by the coils 150 interacts with the second and fourth magnet arrays 140B, 140D to drive the mover 100'. While there may be some interaction between the electromagnetic field generated by the coils 150 with the first and third magnet arrays 140A, 140C as the mover 100' is being driven from left-to-right, identical construction of the first and third magnet arrays 140A, 140C results in a balanced interaction along either side of the mover 100' such that the force generated by an interaction of the electromagnetic field with the first magnet array 140A cancels the force generated by an interaction of the electromagnetic field with the third magnet array 140C.

Once in the middle of the switch track segment 212, the mover 100' may be controlled to exit the switch track segment in any direction. When the mover 100' arrives at or as the mover 100' approaches the center of the switch track segment 212, the segment controller 50 for the switch track segment determines in which direction the mover 100' is commanded to leave from the switch track segment. According to a first path, the mover 100' may continue straight to the right from the switch track segment 212. The segment controllers 50 for the switch track segment 212 and the right track segment 12 regulate current in the coils to continue interaction with the second and fourth magnet arrays 140B, 140D to drive the mover 100' from the center of the switch track segment 212 and on to the right track segment 12. According to a second or third path, the mover 100' may be required to change direction and exit the switch track segment 212 toward the top or bottom of the illustrated embodiment. The segment controllers 50 for the switch track segment 212 and either the upper or lower track segment 12 regulate current in the coils to interact with the first and third magnet arrays 140A, 140C to drive the mover 100' from the center of the switch track segment 212 on to either the upper or lower track segment 12. Similar to the construction of the first and third magnet arrays 140A, 140C, the second and fourth magnet arrays 140B, 140D may also have identical construction to either side of the center of the mover 100' Thus, as the mover 100' is being driven as a result of the force generated by interaction of the electromagnetic field with the first and third magnet arrays 140A, 140C, the force generated by an interaction of the electromagnetic field with the second magnet array 140B cancels the force generated by an interaction of the electromagnetic field with the fourth magnet array 140D. The embodiment illustrated by FIGS. 17 and 18, utilizing multiple magnet arrays 140 mounted on the mover, allows for zero radius change of direction on a switch track segment 212 with no additional moving parts.

Figure 29:
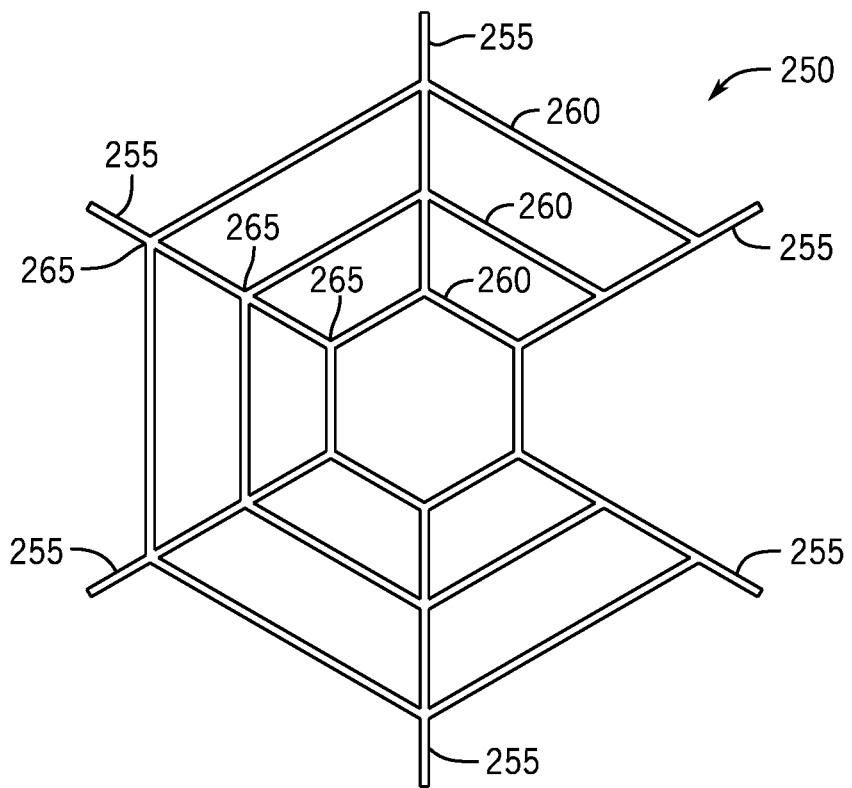
FIG. 29 is a top plan view of a track layout for one application incorporating one embodiment of the invention.
Figure 30:
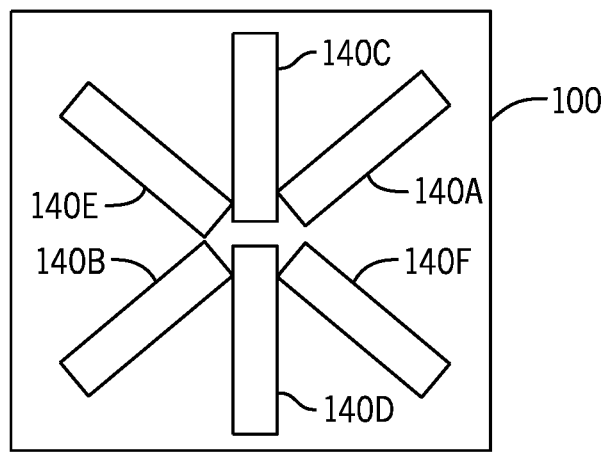
FIG. 30 is a block diagram representation of another drive magnet configuration for a mover configured to operate on the track layout in FIG. 29.

Turning next to FIGS. 29 and 30, another mover 100 configuration is illustrated. With reference to FIG. 30, a mover 100 may have six magnet arrays 140A-140F mounted on the mover 100. A first pair of magnet arrays 140A, 140B are mounted along a first axis. A second pair of magnet arrays 140C, 140D are mounted along a second axis. A third pair of magnet arrays 140E, 140F are mounted along a third axis. Each pair of magnet arrays allows the mover 100 to travel in either direction along a track, where multiple paths intersect. FIG. 29 illustrates an exemplary track layout configured with multiple main branches 255 and multiple parallel branches 260, where the parallel branches each extend between two main branches 255 and join the main branches at intersections 265. The track layout includes six main branches 255 extending outward from a central region. Six parallel branches 260 connect a first end of each of the main branches in a hexagonal structure. Additional sets of parallel branches 260 are arranged in a concentric manner extending outward from the central region. Multiple parallel branches 260 allow movers 100 to pass between adjacent main branches 255 at multiple intervals. For example, if two movers 100 are located on adjacent main branches 255 and each mover 100 needs to transition to the other main branch, if a single parallel branch 260 existed, the movers would need to take turns traversing the single parallel branch 260. In the illustrated embodiment, a first mover 100 on one main branch 255 may traverse a first parallel branch 260 in one direction, and a second mover 100 on the other main branch 255 may traverse a second parallel branch 260 in the other direction at the same time the first mover 100 is travelling on the first parallel branch.

According to another aspect of the invention, a mover 100''' has a single magnet array 140 mounted on the mover, where the magnet array 140 is selectively positioned between multiple positions. According to the embodiment illustrated in FIG. 15, the magnet array 140 is located in a first position. The first position is arranged in a top-to-bottom orientation with respect to the illustration. The dashed arrow and dashed outline in FIG. 15 represent the rotation of the magnet array 140 from the top-to-bottom orientation to a side-to-side orientation. A bearing assembly 142, or other pivotal mount, is provided on the bottom of the mover 100''' to which the magnet array 140 is mounted. The bearing assembly 142 allows the magnet array 140 to rotate between positions. Although the embodiment illustrated in FIG. 15 shows two positions, it is contemplated that still additional positions may be provided, allowing for additional directions of travel by the mover 100'''. A first engagement member 144 is provided on the magnet array 140 to cause rotation of the magnet array between different positions of travel.

Figure 21:
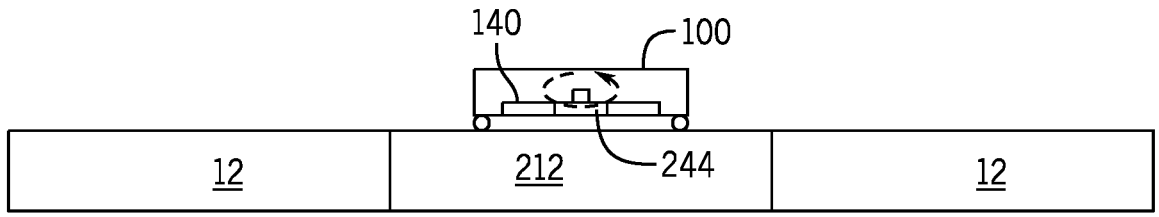
FIG. 21 is a block diagram representation of a mover on a switch track segment according to one embodiment of the invention.

According to one embodiment of the invention, the first engagement member 144 may be mounted on the mover 100 and be configured to selectively position the magnet array 140 without requiring a separate engagement member. With reference to FIG. 21, the illustrated first engagement member 244 includes a rotatable member mounted on the mover 100. The mover 100 may include a power source, such as a battery, capacitor, or other energy storage device mounted on the mover. According to one aspect of the invention, the mover 100 may receive power via wireless power transfer between the track and the mover 100 as the mover travels along the track. Optionally, the mover 100 may receive power at a fixed station, where the energy storage device is periodically charged. The mover 100 stores this energy in a battery for subsequent use. One such use is to power an actuator to rotate the first engagement member 244 between different positions. When the mover 100 travels onto and reaches the middle of a switch track segment 212, the first engagement member 244 is energized to rotate the magnet array 140 to a position corresponding to a desired path of travel. The control module 235 for the switch track segment 212 then regulates the current in the coils 150 to control operation of the mover 100 and to continue travel along the desired path of travel.

Figure 22:
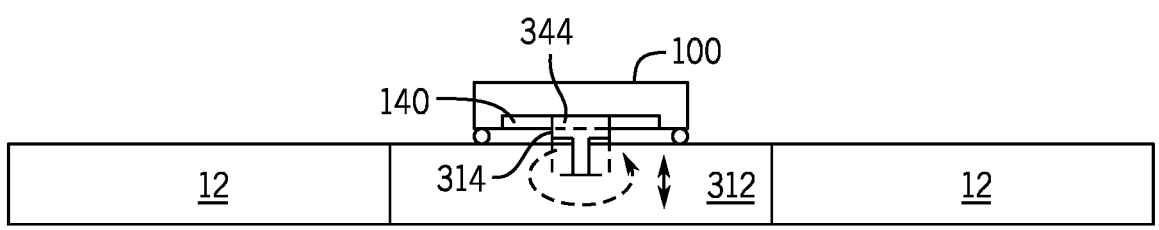
FIG. 22 is a block diagram representation of a mover on a switch track segment according to another embodiment of the invention.

According to another embodiment of the invention, a second engagement member 314, 414 may be provided on a switch track segment 312, 412 to engage the first engagement member 144 on the magnet array 140 to cause rotation of the magnet array. With reference to FIG. 22, the second engagement member 314 is configured to extend and retract from the switch track segment 312 as well as rotate between different positions. When the mover 100 is not present on or as the mover is travelling onto the switch track segment 312, the second engagement member 314 remains retracted. The second engagement member 314 may be partially or fully retracted below the surface of the switch track segment 312, but in either instance, the second engagement member 314 is clear of the mover 100 travelling onto the switch track segment 312. When the mover 100 reaches the center of the switch track segment 312, the second engagement member 314 extends to engage the first engagement member 344 present on the mover 100. The second engagement member rotates to selectively position the drive magnet array 140 between different positions, where each position corresponds to a path along the switch track segment 312. After aligning the drive magnet array 140 with a desired path, the second engagement member 314 retracts and disengages from the first engagement member 344. The mover 100 is then able to resume moving along the selected path.

Figure 17:
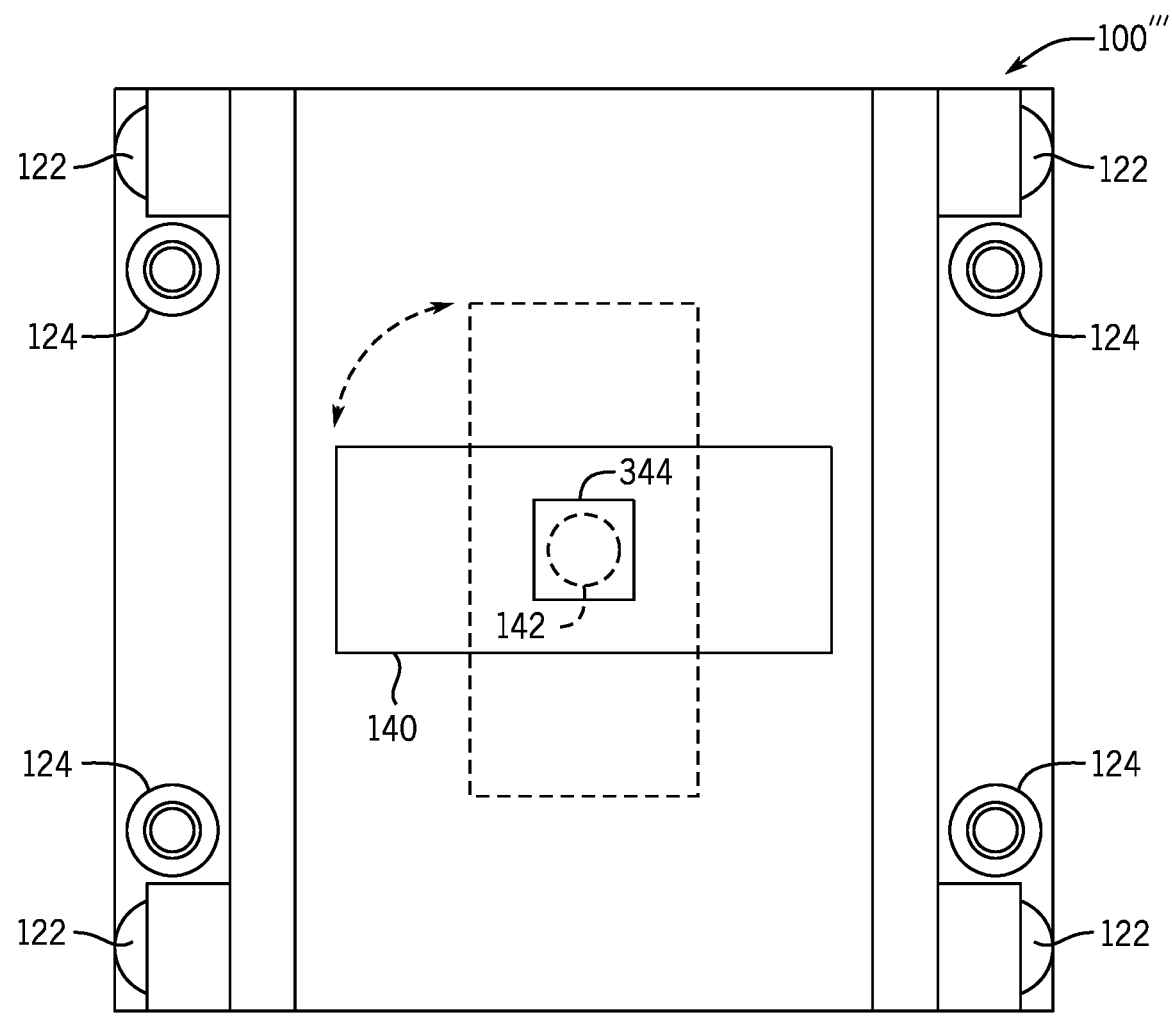
FIG. 17 is a bottom plan view of another embodiment of the mover of FIG. 12.
Figure 18:
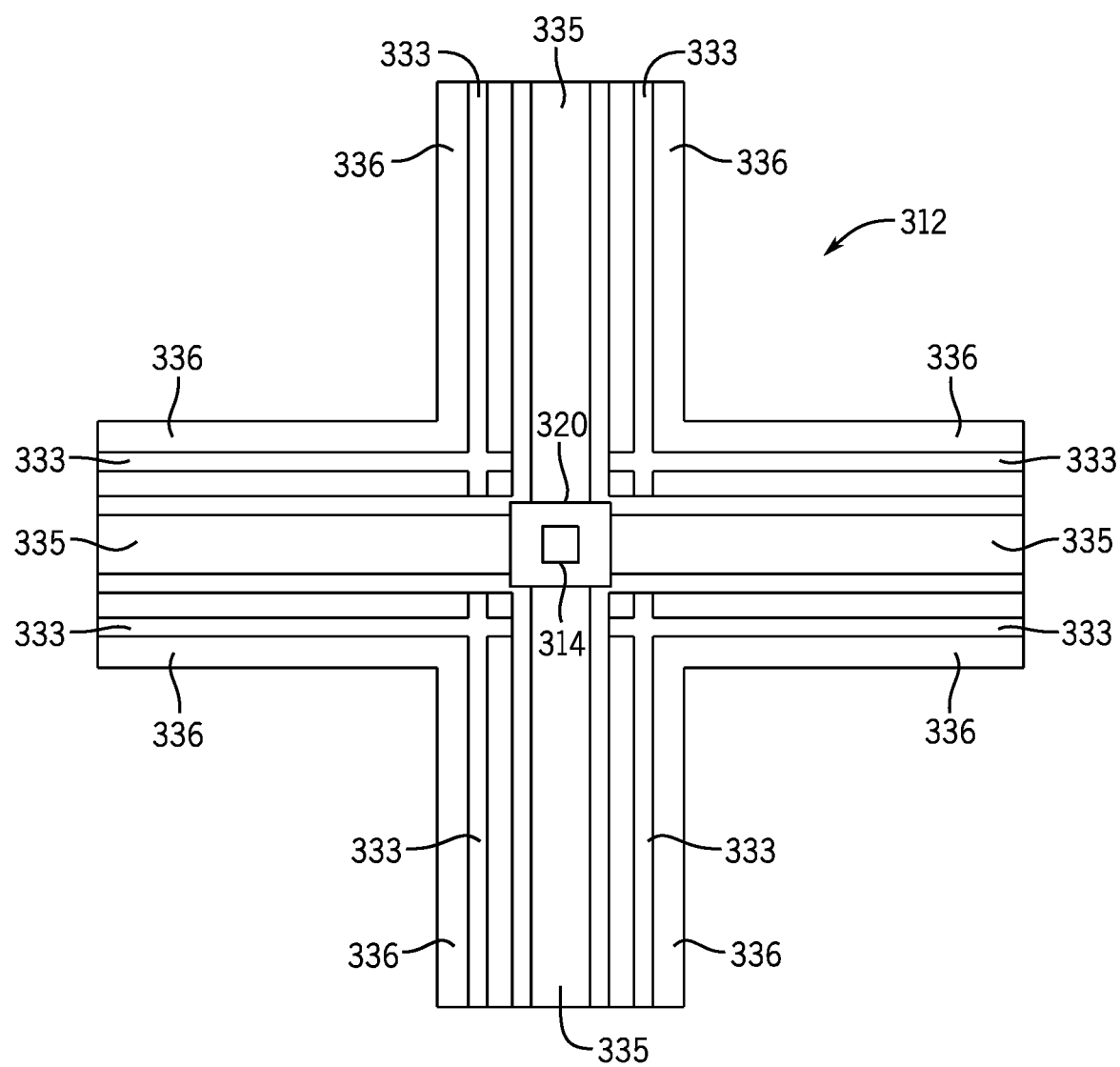
FIG. 18 is a top plan view of a switch track segment according to one embodiment of the invention.

With reference also to FIGS. 17 and 18, the first and second engagement members 344, 314 have complementary sectional configurations, such that the second engagement member 314 is able to engage the first engagement member 344. According to the embodiment illustrated in FIGS. 17 and 18, the sectional configuration for both the first and second engagement members is square. The second engagement member 314 has a square sectional area and is raised and lowered by an actuator 320 positioned below the engagement member 314. The first engagement member 344 is a recess in the surface of the drive magnet array 140 also having a square sectional area. When the second engagement member 314 is extended by the actuator 320, the second engagement member 314 is inserted into the recess defining the first engagement member 344. The actuator 320 is also configured to rotate the second engagement member to selectively align the magnet array 140 with a desired position. In FIG. 17, the magnet array 140 is illustrated in a side-to-side position. The dashed line and dashed arrow illustrate the magnet array 140 being rotated into a top-to-bottom position.

With reference to FIG. 18, the mover 100''' of FIG. 17 corresponds to the mover discussed in FIGS. 12-16. The switch track segment 312 includes channels 333 along the upper surface 336 of the rails for the switch track segment 312. The channels 33 intersect at the point along the switch track segment 312 where the second engagement member 314 is located. Similar to the track segments 12 discussed above, the channels 333 may act in conjunction with side rails along each path of the switch track segment 312 to guide each mover 100''' along a desired path of operation. Optionally, the channels 333 may act independently without side rails to guide each mover 100''' along a desired path of operation.

Figure 23:
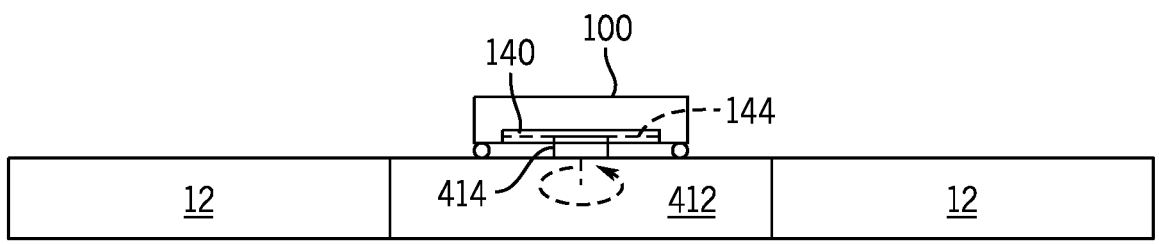
FIG. 23 is a block diagram representation of a mover on a switch track segment according to still another embodiment of the invention.

According to still another embodiment of the invention, the second engagement member 414 may be arranged at a fixed height with respect to the switch track segment 412. With reference to FIG. 23, the second engagement member 414 is configured to rotate between different positions but is not required to extend and retract. The second engagement member 414 may be an elongated rectangular member. A width of the second engagement member 414 is configured to fit within a width of the first engagement member 144. Referring, for example, to FIG. 15, the first engagement member 144 may be a slot extending the length of the magnet array 140, and the bottom of the magnet array 140 may extend below the bottom of the body of the mover 100. The second engagement member 414 is oriented in a direction to receive the mover 100 as the mover 100 travels onto the switch track segment 412. When the mover 100 reaches the center of the switch track segment 412, the second engagement member 414 rotates to selectively position the drive magnet array 140 between different positions, where each position corresponds to a path along the switch track segment 412. After aligning the drive magnet array 140 with a desired path, the mover 100 is then able to resume moving along the selected path and the first engagement member 144 slides off the second engagement member 414 as the mover 100 travels away from the switch track segment 412.

Figure 24:
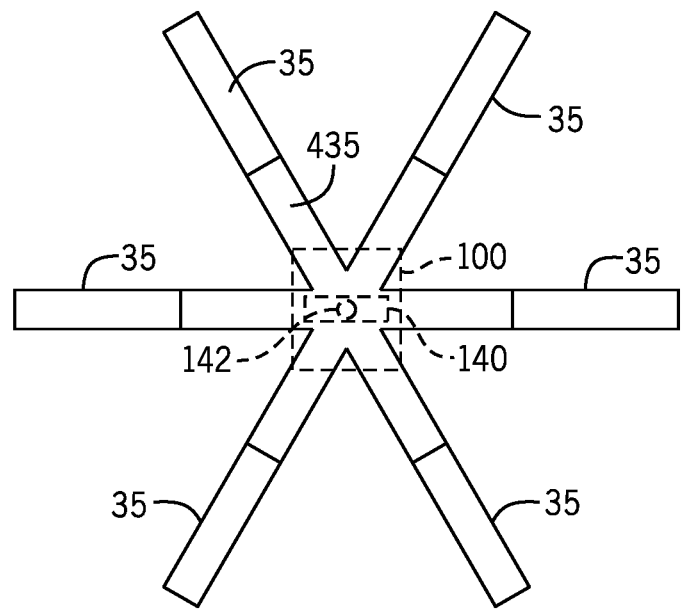
FIG. 24 is a top plan view of a switch track segment with six branches.
Figure 25:
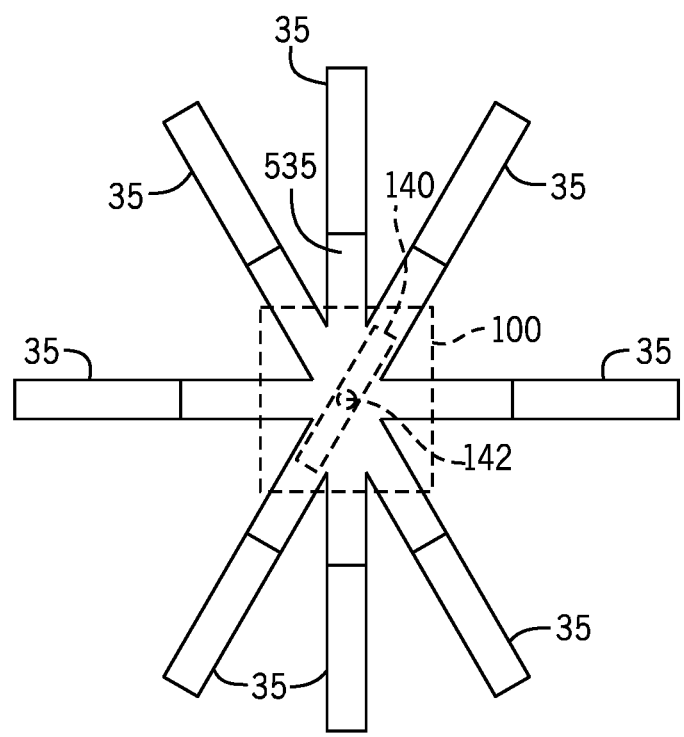
FIG. 25 is a top plan view of a switch track segment with eight branches.

With any of the embodiments of first and second engagement members discussed above, the mover 100 is able to transition between paths on the switch track segment 412 without requiring a curved transition between desired paths. FIGS. 18 and 20 illustrate switch track segments 212, 312 including four different branches. Turning next to FIGS. 24 and 25, still other switch track segments may include varying numbers of branches. For case of illustration, FIGS. 24 and 25 illustrate just a control module for each of the switch track segments. FIG. 24 illustrates a control module 435 with six different branches, and FIG. 25 illustrates a control module 535 with eight different branches. The mover 100 travels onto the switch track segment from any of the branches connected to the switch track segment. A control module 35 in an adjacent track segment works in conjunction with the control module 435, 535 on the switch track segment to transfer the mover 100 to the switch track segment. The control module 435, 535 on the switch track segment receives a command signal identifying a desired destination for the mover, and the control module 435, 535 determines which path the mover 100 is required to follow to leave the switch track segment. Optionally, the switch track segment receives a command signal which simply identifies a specific branch from which the mover 100 is to exit. The control module 435, 535 for the switch track segment propels the mover 100 to the center of the switch track segment and activates the first or second engagement members to cause the magnet array 140 to rotate to the direction of the desired exit path. Once the magnet array 140 is oriented toward the desired direction, the switch track segment deactivates the first or second engagement members such that the mover 100 is free to move.

Figure 26:
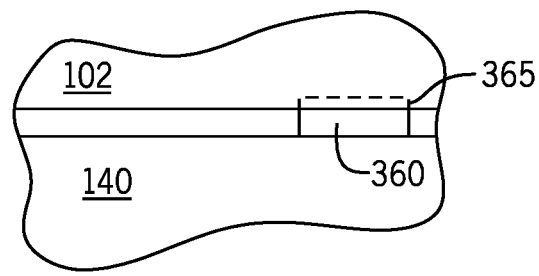
FIG. 26 is a partial side view of a locking mechanism extending between a magnet array and a mover body according to one embodiment of the invention.
Figure 27:
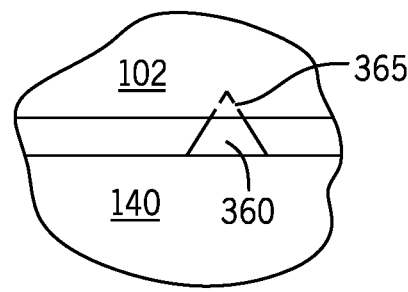
FIG. 27 is a partial front view of the locking mechanism of FIG. 26.

According to another aspect of the invention, each mover 100 may include a locking mechanism to retain the magnet array 140 at a desired orientation. With reference to FIGS. 26 and 27, a first embodiment of the locking mechanism is illustrated. A wedge-shaped member 360 is mounted on the top of the magnet array 140. The wedge-shaped member 360 extends into a cavity 365 within the body 102 of the mover when the magnet array 140 is located at one of the desired positions. The wedge-shaped member is made of a compressible and resilient material such that the wedge-shaped member is deflected and/or compressed between the top of the magnet array 140 and the bottom of the body 102 of the mover as the magnet array 140 is rotated between positions. When the magnet array 140 becomes aligned with one of the desired positions, the wedge-shaped member returns to its original form, filing the cavity 365 in the body 102 of the mover at the corresponding position.

Figure 28:
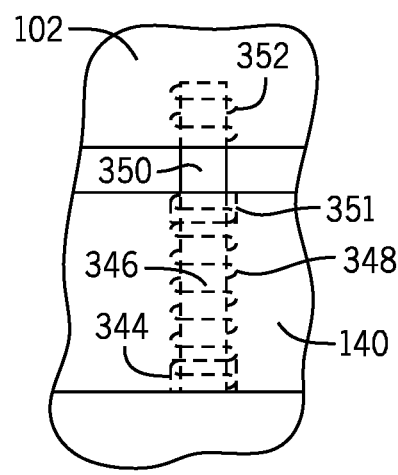
FIG. 28 is a partial side view of a locking mechanism extending between a magnet array and a mover body according to another embodiment of the invention.

With reference to FIG. 28, the locking mechanism may be engaged by the second engagement member 314 on the switch track segment 312. The locking mechanism includes a first pin 346 extending through the magnet array 140. A first end of the first pin 346 extends into the recess defining the first engagement member 344. When the second engagement member 314 extends into the first engagement member 344, the first pin 346 is deflected upward toward the body 102 of the mover. A first spring 348 is fit around the first pin 346, and the first spring 348 is compressed as the first pin 346 is deflected upward. When the second engagement member 314 is retracted from the first engagement member 344, the first spring 348 causes the first pin 346 to return to its original position within the recess defining the first engagement member 344. The illustrated locking mechanism further includes a second pin 350 extending from the body 102 of the mover into a cavity 351 on the top of the magnet array 140. As the first pin 346 is driven upward, a second end of the first pin 346 contacts the second pin 350 and pushes the second pin 350 out of the cavity 351. A second spring 352, located within the body 102 of the mover, is compressed by the second pin 350 being pushed out of the magnet array 140. When the first pin 346 retracts, the second spring 352 forces the second pin 350 downward toward the cavity 351 on the magnet array 140. With the second pin 350 retracted from the magnet array 140, the magnet array 140 is free to rotate. With the second pin 350 inserted into the magnet array 140, the magnet array 140 is held in place. Thus, the second engagement member 314 releases the locking mechanism for the magnet array 140 as it engages the first engagement member 344 on the magnet array.

According to still another aspect of the invention, the strength of the magnetic field generated by the magnet array 140 may be suitable to maintain a desired orientation of the magnet array 140. The control module 235, 335, 435, 535 for the switch track segment 212, 312, 412, 512 may be made of a magnetic receptive material. Alternately, the coils 150 within the control module include a back iron or are wound around magnetic receptive core material. The magnetic field generated by the magnets 130 in the magnet array 140 are attracted to the magnetic receptive material within the control modules as the magnet array rotates. Thus, the engagement between the first and second engagement members may be used to orient the magnet array 140 along a desired path, but the magnetic attraction between the magnets 130 in the magnet array and the coils, or magnetic receptive material in the coils, will prevent the magnet array 140 from leaving a desired orientation until the first and second engagement members again operate to select a new desired orientation of the magnet array 140.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A system for changing direction in an independent cart system, comprising:
a mover, further comprising:
a body, and
a drive magnet array movably mounted to the body, the drive magnet array, including:
at least one drive magnet, and
a first engagement member for positioning the drive magnet array;
a plurality of track segments, wherein each track segment includes a plurality of coils spaced along a length of the track segment and wherein the plurality of coils are selectively energized to generate an electromagnetic field that interacts with the drive magnet array to propel the mover along the track segment; and
a switch track segment, further comprising:
a first path extending across the switch track segment in a first direction, wherein the first path includes a first plurality of coils to propel the mover along the first path;
a second path extending across the switch track segment in a second direction, wherein the second direction is different than the first direction, the second path intersects the first path, and the second path includes a second plurality of coils to propel the mover along the second path; and
a second engagement member, wherein the second engagement member selectively engages the first engagement member to position the drive magnet array between a first position, aligned with the first path, and a second position, aligned with the second path.

2. The system of claim 1, wherein each track segment further comprises:
a first side rail along a first side of the track segment, and
a second side rail along a second side of the track segment, wherein the mover is configured to engage each of the first and second side rails to travel along the track segment.

3. The system of claim 1, wherein:
the mover further comprises a plurality of multidirectional wheels on which the mover travels, and
each track segment further comprises:
a surface on which the mover is supported as the mover travels along the track segment, and
at least one channel along the surface, wherein the channel receives at least one of the plurality of multidirectional wheels as the mover travels along the track segment.

4. The system of claim 1, wherein the mover further comprises a locking mechanism to selectively secure the drive magnet array in either the first position or the second position, wherein the locking mechanism is released when the second engagement member selectively engages the first engagement member and the locking mechanism is engaged when the second engagement member disengages the first engagement member.

5. The system of claim 1, wherein:
the body of the mover, includes:
four sides, and
at least one wheel mounted to each of the four sides;
each track segment, includes:
a first rail along a first side of the track segment,
a second rail along a second side of the track segment, and
a gap between the first and second rails.

6. The system of claim 1, wherein the second engagement member selectively extends and retracts to engage the first engagement member.

7. The system of claim 1, wherein:
the first engagement member includes a slot extending along the drive magnet array, and
the second engagement member engages the slot as the mover travels onto the switch track segment.

8. A system for changing direction in an independent cart system, comprising:
a mover, further comprising:
a first magnet array mounted on the mover and extending in a first direction on the mover, and
a second magnet array mounted on the mover and extending in a second direction on the mover,
a plurality of track segments, wherein each track segment includes a plurality of coils spaced along a length of the track segment and wherein the plurality of coils are selectively energized to generate an electromagnetic field that interacts with either the first magnet array or the second magnet array to propel the mover along the track segment; and
a bidirectional track segment, wherein:
the bidirectional track segment includes a first plurality of coils arranged in a first direction along a first length of the bidirectional track segment,
the bidirectional track segment includes a second plurality of coils arranged in a second direction along a second length of the bidirectional track segment,
the first plurality of coils are selectively energized to generate an electromagnetic field that interacts with the first magnet array to propel the mover in the first direction along the bidirectional track segment, and
the second plurality of coils are selectively energized to generate an electromagnetic field that interacts with the second magnet array to propel the mover in the second direction along the bidirectional track segment.

9. The system of claim 8, wherein each track segment further comprises:
a first side rail along a first side of the track segment, and
a second side rail along a second side of the track segment, wherein the mover is configured to engage each of the first and second side rails to travel along the track segment.

10. The system of claim 8, wherein:
the mover further comprises a plurality of multidirectional wheels on which the mover travels, and
each track segment further comprises:
a surface on which the mover is supported as the mover travels along the track segment, and
at least one channel along the surface, wherein the at least one channel receives at least one of the plurality of multidirectional wheels as the mover travels along the track segment.

11. A system for changing direction in an independent cart system, comprising:
a drive magnet array movably mounted to a body of a mover, the drive magnet array further comprising:
at least one drive magnet configured to engage an electromagnetic field generated by a plurality of coils extending along a track for the independent cart system to propel the mover along the track, and
a first engagement member for selectively positioning the drive magnet array between at least a first position and a second position; and
a switch track segment defining at least a first path for the mover and a second path for the mover, wherein:
the first path includes a first plurality of coils to generate the electromagnetic field to propel the mover along the first path,
the second path includes a second plurality of coils to generate the electromagnetic field to propel the mover along the second path,
the drive magnet array is aligned with the first path when the drive magnet array is in the first position, and
the drive magnet array is aligned with the second path when the drive magnet array is in the second position.

12. The system of claim 11, wherein the first engagement member is operatively connected to the drive magnet array and rotates to selectively position the drive magnet array in either the first position or the second position.

13. The system of claim 12, further comprising an energy storage device mounted to the body of the mover, wherein the first engagement member is an actuator selectively energized by energy stored in the energy storage device.

14. The system of claim 11, further comprising a second engagement member mounted on the switch track segment, wherein the second engagement member is configured to selectively engage the first engagement member to position the drive magnet array in either the first position or the second position.

15. The system of claim 14, wherein the second engagement member selectively extends and retracts with respect to a surface of the switch track segment to engage the first engagement member.

16. The system of claim 14, wherein the first engagement member includes a slot extending along the drive magnet array and the second engagement member engages the slot as the mover travels onto the switch track segment.

17. The system of claim 11, further comprising:
a plurality of track segments, wherein:
each track segment includes a plurality of coils spaced along a length of the track segment,
the plurality of coils are selectively energized to generate an electromagnetic field that interacts with the drive magnet array to propel the mover along the track segment,
at least one of the plurality of track segments is aligned with the first path on the switch track segment, and
at least one of the plurality of track segments is aligned with the second path on the switch track segment.

18. The system of claim 17, wherein each of the plurality of track segments further comprises:
a first side rail along a first side of the track segment, and
a second side rail along a second side of the track segment, wherein the mover is configured to engage each of the first and second side rails to travel along the track segment.

19. The system of claim 17, wherein each of the plurality of track segments further comprises:
a surface on which the mover is supported as the mover travels along the track segment, and
at least one channel along the surface, wherein the at least one channel receives at least one multidirectional wheels mounted on the mover as the mover travels along the track segment.

20. The system of claim 11, further comprising a locking mechanism mounted on each mover to selectively secure the drive magnet array in either the first position or the second position, wherein the locking mechanism is released when the first engagement member selectively positions the drive magnet array between at least a first position and a second position.

\* \* \* \* \*